US011610051B2

(12) United States Patent
Booth et al.

(10) Patent No.: US 11,610,051 B2
(45) Date of Patent: Mar. 21, 2023

(54) DYNAMICALLY GENERATING DOCUMENTS USING NATURAL LANGUAGE PROCESSING AND DYNAMIC USER INTERFACE

(71) Applicant: Rowan TELS Corp., Seattle, WA (US)

(72) Inventors: Simon Booth, Washington, DC (US); Brian McKnight, Washington, DC (US); Tom Isaacson, Washington, DC (US); Shelton Austin, Washington, DC (US); Gregory Durbin, Washington, DC (US)

(73) Assignee: Rowan TELS Corp., Seattle, WA (US)

( * ) Notice: Subject to any disclaimer, the term of this patent is extended or adjusted under 35 U.S.C. 154(b) by 51 days.

(21) Appl. No.: 17/014,403

(22) Filed: Sep. 8, 2020

(65) Prior Publication Data

US 2022/0075929 A1 Mar. 10, 2022

(51) Int. Cl.
*G06F 40/166* (2020.01)
*G06F 40/284* (2020.01)
*G06F 40/253* (2020.01)
*G06F 40/289* (2020.01)

(52) U.S. Cl.
CPC .......... *G06F 40/166* (2020.01); *G06F 40/253* (2020.01); *G06F 40/284* (2020.01); *G06F 40/289* (2020.01)

(58) Field of Classification Search
None
See application file for complete search history.

(56) References Cited

U.S. PATENT DOCUMENTS

| | | | |
|---|---|---|---|
| 10,417,341 B2 | 9/2019 | Schick et al. | |
| 10,747,953 B1* | 8/2020 | Priyadarshi | G06F 40/103 |
| 2007/0136321 A1* | 6/2007 | Allen | G06Q 50/184 |
| 2008/0178114 A1* | 7/2008 | Milton | G06F 40/169 |
| | | | 715/779 |
| 2008/0313528 A1* | 12/2008 | Chang | G06Q 50/18 |
| | | | 715/200 |
| 2009/0210828 A1* | 8/2009 | Kahn | G06F 40/169 |
| | | | 715/205 |
| 2013/0042170 A1* | 2/2013 | Milton, Jr. | G06Q 10/10 |
| | | | 715/225 |
| 2013/0198092 A1* | 8/2013 | Dugan | G06Q 99/00 |
| | | | 705/310 |
| 2013/0317994 A1* | 11/2013 | Tran | G06Q 50/184 |
| | | | 705/310 |

(Continued)

OTHER PUBLICATIONS

Parapatics, Peter, and Michael Dittenbach. "Patent claim decomposition for improved information extraction." In Current Challenges in Patent Information Retrieval, pp. 197-216. Springer, Berlin, Heidelberg, 2011. (Year: 2011).*

(Continued)

*Primary Examiner* — Frank D Mills
(74) *Attorney, Agent, or Firm* — Polsinelli PC

(57) ABSTRACT

An NLP analysis method based on identification of common terms is disclosed. The improved NLP analysis can separate different parts of a patent claim into discrete claim segments based on the common terms. A user interface that corresponds to a flowchart allows the user to drag and drop the claim segments to form complex relationships, which is used to generate a patent specification.

31 Claims, 12 Drawing Sheets

(56) References Cited

U.S. PATENT DOCUMENTS

| | | | |
|---|---|---|---|
| 2017/0075877 A1* | 3/2017 | Lepeltier | G06F 40/117 |
| 2017/0097747 A1* | 4/2017 | Allen | G06Q 10/10 |
| 2017/0098290 A1* | 4/2017 | Allen | G06Q 50/18 |
| 2017/0344533 A1* | 11/2017 | Tsai | G06F 16/3335 |
| 2018/0173811 A1* | 6/2018 | Aragon y Willems | G06F 16/93 |
| 2018/0232361 A1* | 8/2018 | Schick | G06Q 50/184 |
| 2018/0341630 A1* | 11/2018 | DeVries | G06F 40/14 |
| 2018/0365781 A1* | 12/2018 | Tsai | G06F 40/268 |
| 2019/0057074 A1* | 2/2019 | Carey | G06F 16/3344 |
| 2019/0340217 A1* | 11/2019 | Tran | G06F 40/253 |
| 2020/0151393 A1* | 5/2020 | Schick | G06Q 50/184 |
| 2021/0012444 A1* | 1/2021 | Carey | G06F 40/14 |

OTHER PUBLICATIONS

Thean, Andrew, Jean-Marc Deltorn, Patrice Lopez, and Laurent Romary. "Textual summarisation of flowcharts in patent drawings for CLEF-IP 2012." In CLEF 2012. 2012. (Year: 2012).*

Lillemo, Shawn; "Become a Superhero—2019 IPO Annual Meeting Patent Drafting Automation"; Harrity & Harrity; https://www.youtube.com/watch?v=egdRXS8iQeo.

* cited by examiner

DYNAMICALLY GENERATING DOCUMENTS USING NATURAL LANGUAGE PROCESSING AND DYNAMIC USER INTERFACE

TECHNICAL FIELD

The present technology pertains to a method and apparatus for generating documents using natural language processing and a dynamic user interface.

BACKGROUND

Formal documents that are authored for administrative agencies are required to have specific structure to comport with the administrative agencies requirements. The requirements include procedural-based requirements (e.g., margins, font size, etc.) and statutory-based requirements (content).

FIGS. 1 and 2 illustrate existing systems for generating patent applications. In particular, FIG. 1 illustrates a server-based process to generate the formal document and FIG. 2 illustrates an application-based generation process to generate the patent specification. In general, each of these systems generally receives method claims as input and (1) converts the method claims into apparatus or device claims, (2) generates a description of a flowchart based on a set of method claims (i.e., a single independent claim and generally at least one dependent claim that depends from that single independent claim), and (3) creates a single generic flowchart diagram based on the independent claim. The systems may also be able to insert generic device descriptions and boilerplate based on a client's requirements.

Referring to FIG. 1, a system 100 comprises a client 110 that connects to a webserver 120 for generating the patent specification. In the system 100, the client 110 transmits a document at step 135 that includes a set of method claims to the webserver 120. Having received the document with method claims, the webserver 120 extracts the method claims from the document at step 140. After extracting the claim, the webserver 120 transmits text that corresponds to the method claims to the NLP server at step 145

The NLP server 130 receives the text and processes the text into NLP tokens at step 150. An NLP token (or token) is generally a single word or a single character (e.g., punctuation) and is assigned several properties. For instance, each NLP token is generally assigned an identifier (or ID), a part of speech tag that identifies the part of speech (e.g., noun, verb, etc.), and a dependency label that identifies how the part of speech depends on other tokens, and so forth. In general, NLP engines also assign what is referred to as a fine part of speech, which further clarifies the purpose of that word. For example, a noun can be the object of the sentence, but could also be part of a compound noun (that is, a single object that has a name including several words), which is also referred to as an n-gram.

A dependency label identifies how the token depends on other tokens. For example, an NLP token may be a determiner (i.e., an article such as "the" or "an"), a nominal subject, a clausal subject, an adverbial clause, conjunction, punctuation, and so forth. A dependency label referred to as root corresponds to the root of the sentence or phrase and is not dependent on any other tokens in that sentence. For example, in the sentence "I love fries," the NLP token "love" is the root, "I" is the proper noun having a dependency of noun subject from the root, and "fries" is the noun that is a direct object of the root. For example, the output of this sentence is illustrated in Table 1 below.

TABLE 1

| Id | RootId | Text | Course Tag | Fine Tag | Dependency Label |
|----|--------|------|-----------|----------|------------------|
| 0 | 1 | I | Noun | Personal Pronoun | Nominal Subject |
| 1 | 1 | love | Verb | Non-$3^{rd}$ person present verb | Root |
| 2 | 1 | fries | Noun | Plural Noun | Direct Object |

The NLP server 130 transmits the tokens to the webserver 120 at step 155, which converts the tokens into a patent specification at step 160. The webserver 120 creates a flowchart and a corresponding description to that flowchart based on NLP tokens from the method claims. To create the description of the flowchart, the webserver 120 extracts the individual portions of tokens that can be converted into a single sentence based on the order in which they are identified in the method claim (i.e., text).

Specifically, the webserver 120 converts an active step, which is a clause having an active gerund as its root word, into a sentence using a different tense. For example, the webserver 120 may convert a phrase "performing a function" into "perform a function" and then add generic content such as "a processor may" to the beginning of the phrase, thus forming "a processor may perform a function." In this case, the generic structure is predetermined and not associated with user input. That is, the webserver 120 receives the method claims in a particular sequence and then generates a flowchart description based on the order of claims. After generating the specification, the webserver 120 transmits the patent specification with the flowchart description and additional boilerplate back to the client 110 at step 165. The webserver 120 may also transmit any created flowchart drawings or generic drawings at step 165.

FIG. 2 illustrates a system 200 that is similar to the system 100, but has a different architecture. In particular, the system 200 comprises an application 210, which may be executing on a client computer, which communicates with the NLP server 230.

The application 210 extracts the text of the method claims and transmits the text to the NLP server 230 at step 240. The NLP server 230 processes the text into NLP tokens at step 250 and returns the text as NLP tokens at step 260 to the application 210. In response to receiving the NLP tokens, the application 210 may generate the specification or part of the specification at step 270. The application 210 generates a flowchart based on the independent claim, generates a flowchart description based on the order of the claims, and composes apparatus or device claims from the method claims.

As noted above, the system 100 or system 200 may also compose additional claims from the method claims. In more detail, the system 100 or system 200 converts a method claim, which has gerund verbs, into a device or system claim, which has present tense verbs. However, in each case, the system 100 or system 200 will only provide generic structure (e.g., a processor, a memory, a display). The system 100 or system 200 may also generate "means" claims by changing the preamble and adding "means for" before the root gerund verb.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Figures 1, 2:
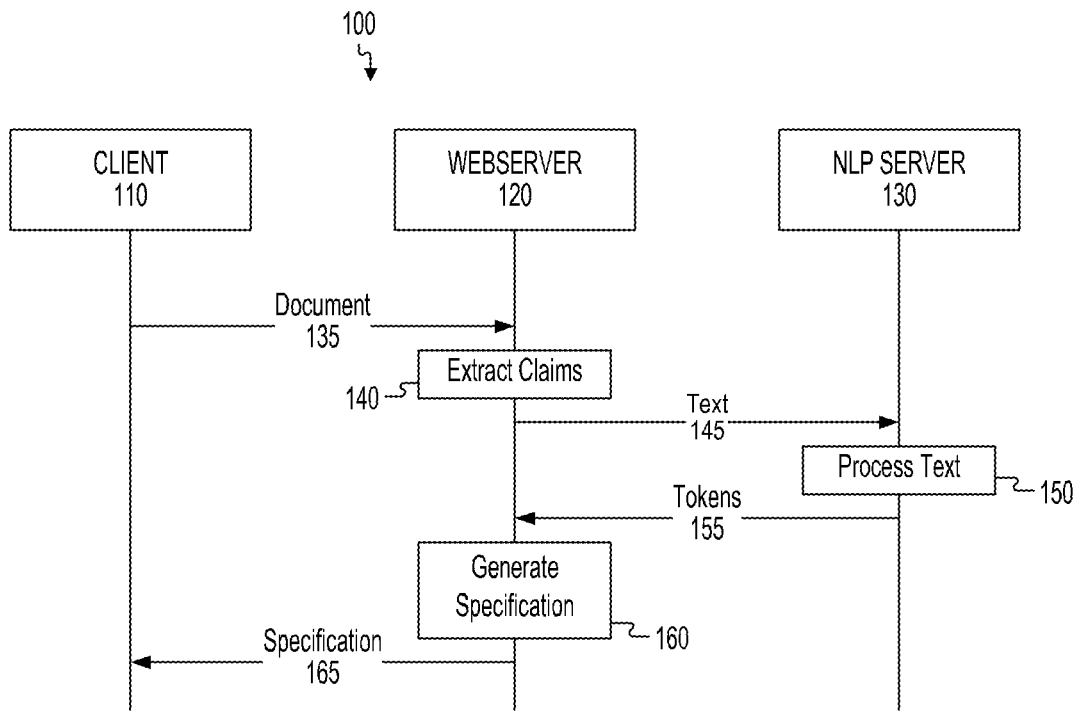
FIGS. 1 and 2 illustrate conventional systems for generating a patent specification.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As machine learning, especially natural language processing (NLP) become more robust it is tempting to look to these tools to perform certain tasks that are considered formulaic. While these tools are indeed beneficial, they are not suitable for producing completed work product in most instances. Machine learning tools are not yet able to take raw inputs, understand them, and write an explanatory document about those raw inputs. Therefore previous attempts at document creation using machine learning tools have focused on using structured inputs.

In the example tools used for drafting patent applications, a common structured input has been claims. Indeed those skilled in the art of drafting patent applications often begin with claims because they are the most important part of the document, and are designed to recite the novel aspects of an invention. However, such tools are limited to restructuring clauses of claims into sentences and pasting them into a document, which is insufficient to produce any useful work product.

For example, the existing tools only repeat the claims in the order they are input via the document and do not distinguish between the differences in the claims. In a patent application, a dependent claim could occur before the first limitation of an independent claim, could occur after the last limitation of the independent claim, or occur anywhere in between the first and last limitations. Moreover, a dependent claim may add subject matter or may further define previous actions. For example, a passive phrase in a dependent claim further defines subject matter to which it refers. Further, an active phrase may be further defined by additional active phrases. The dependent claims may encompass multiple embodiments that are mutually exclusive (i.e., different species).

Existing tools may only generate a drawing based on the independent method claim, thereby producing an incomplete drawing. Further, the existing systems are also unable to identify condition-action sequences (e.g., if a condition is satisfied, perform a function) that would cause the flowchart to have branching logic because NLP itself is unable to disambiguate the meaning of phrases. The existing system are also unable to represent inherent conditions, thus omitting content in the drawing that should be explicit.

The present technology improves over existing solutions by improving the machine-user interface, which provides further inputs into a natural language processing server and yields a more robust output. For example, in some embodiments the present technology utilizes an input collection of statements. In the case of a patent application the statements can be elements of claims, while in the case of a contract the statements can be a description of major deal terms. In the case of a technical paper these statements can be sentences reciting key points to be described.

The present technology can analyze the statements and can organize them into an initial order based on relationships and dependencies perceived based on the tokens provided from the NLP server. This initial organization can be in the form of a flowchart or an outline. However the present technology recognizes that, in the process of writing a complex document thoughts need to be rearranged, additional thoughts may be added, and thoughts may be refined. As such the present technology provides an interface by which the initial order can be reorganized based on the judgment of a human author.

In some embodiments, the present technology can provide prompts to a user to provide disambiguation for terms, or to provide additional descriptive details. In this way, the present technology can encourage the user to provide additional input that may be beneficial to the NLP analysis.

By improving the machine-user interface, the present technology can ultimately provide a more usable initial output to an author of a document. A goal of the present technology is to provide the output that provides efficiency to an author, while leaving room for an author to provide the ingenuity and thoughtfulness that only a human author can provide.

Through improvements in the machine-user interface, the present technology is also able to accommodate more complex relationships between phrases. For example the present technology can accommodate and describe conditional logic, or descriptions nested in other descriptions.

In addition the present technology provides various other improvements, some of which are specific to drafting of patent applications. For example the present technology encourages input of detailed and numerous dependent claims so that the NLP server can provide the foundation for a detailed patent application. However recognizing that there are some restraints on the number of claims that an author may wish to include in a patent application, and recognizing that not all topics recited in claim are useful for inclusion in a figure, the present technology can allow a user to suppress portions of a claim from appearing in a claim section of a document or from appearing in the drawings accompanying a patent application.

These and other improvements to tools that use algorithms or NLP to create documents are described herein.

Figure 3:
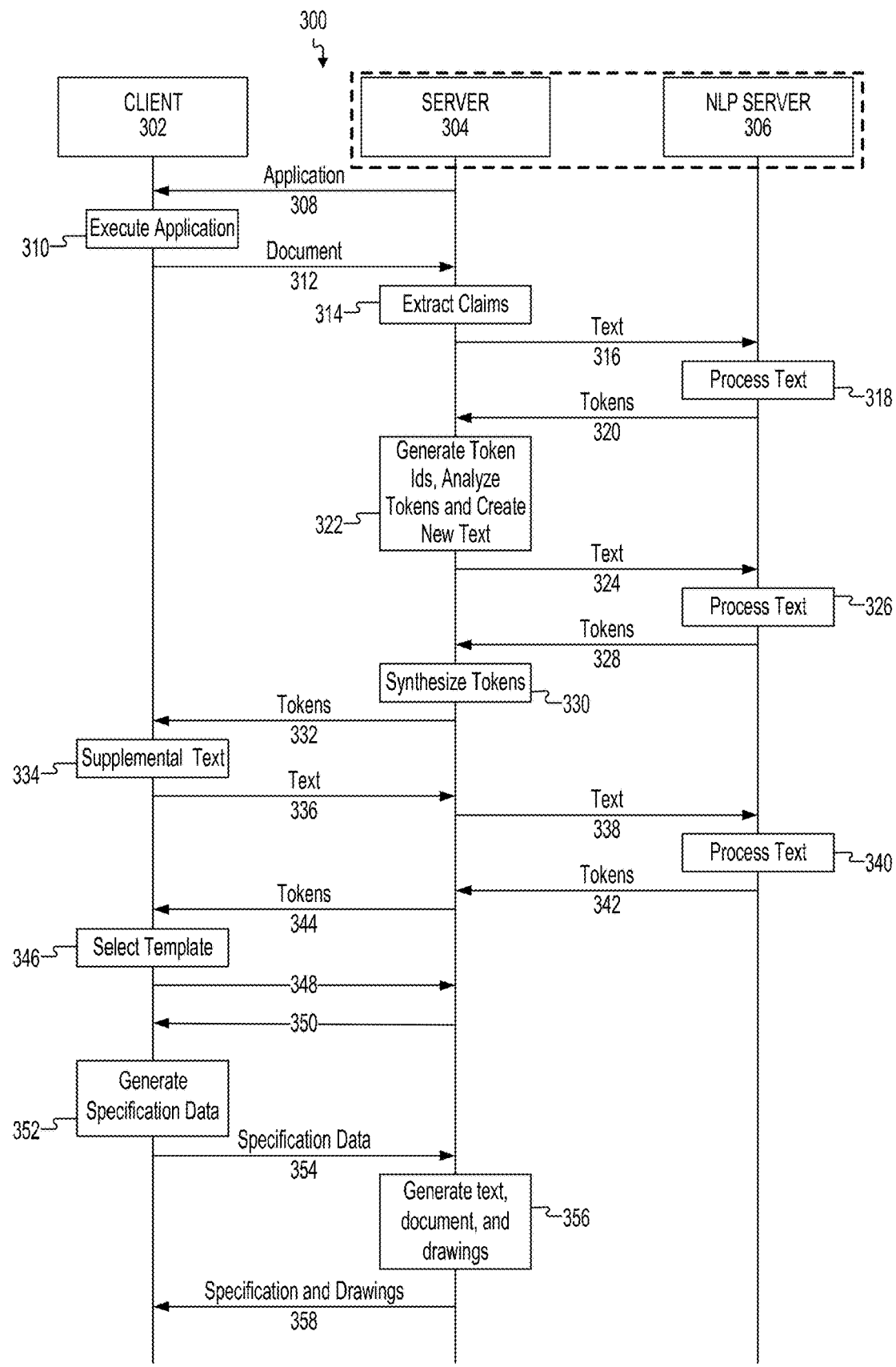
FIG. 3 illustrates a sequence diagram of an example system for dynamically generating documents using NLP and a dynamic user interface.

FIG. 3 illustrates a sequence diagram of an example system 300 for dynamically generating standardized documents using NLP and a dynamic user interface. For example, the documents can be a document for submission to an administrative agency based on that administrative agency's procedural requirements. The disclosed system can be applied to any type of standardized document that has a structure that may benefit from visually organizing concepts to form complex relationships from input text.

Figure 4:
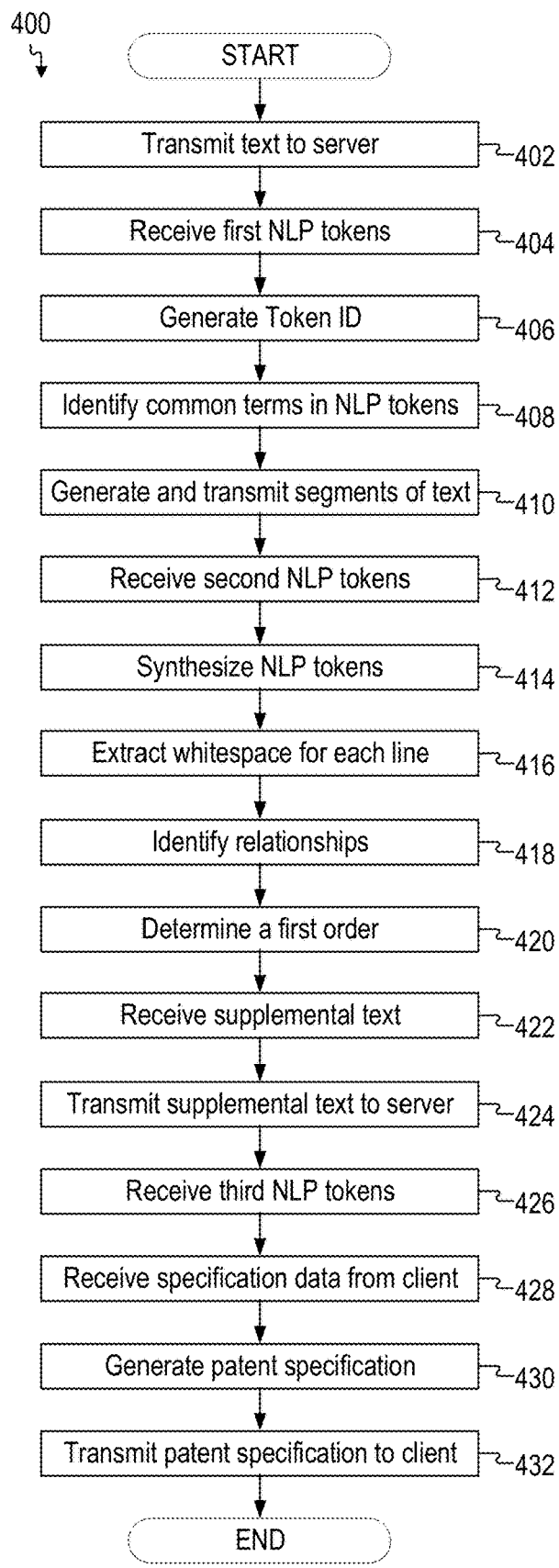
FIG. 4 is a flowchart of a method for segmenting text into tokens and claim segments.

In the context of a patent application, the system 300 provides an improved NLP analysis method that is illustrated in FIGS. 3 and 4. Further, an application that is executing within the system 300 may include a dynamic user interface that is illustrated in FIGS. 5 to 10 to allow the user to input method claims, sequence the steps of the claims together with an intuitive user interface, and intelligently compose portions of a patent specification. Further, the dynamic user interface allows the user to identify structures associated with actions within the claims, which can then be used to more intelligently compose claims and draft the specification based on input method claims.

The system 300 comprises a client 302, a server 304, and a NLP server 306. In some examples, the server 304 and the NLP server 306 can be different server processes executing on the same hardware or configured virtual machine. In the event that the NLP server 306 is hosted locally on the same server as the server 304, the NLP engine may be based on a local NLP engine such as natural language toolkit (NLTK), Stanford CoreNLP, etc. However, the NLP server 306 may also be a third party server such as Google Natural Language, Microsoft Cognitive Services, or Amazon Comprehend.

As an example, a virtual machine can be execute a webserver in a reverse proxy configuration, which parses the requested uniform resource identifier (URI) and directs the request to the server 304 or NLP server 306 based on the URI. For example, any URI beginning with "/nlp" (e.g., "/nlp/document", "/nlp/phrases", etc.) is forwarded to the NLP server executing on port 9000. Any other URI is forward to the server 304 executing on port 6000. In another example, the functionality provided by the server 304 may be performed based on an application executing on the client 302 (e.g., a Native React application, etc.) that include local libraries and is able to directly access the file system of the client 302.

In this example, the client 302 receives an application from the server 304 at step 308. For example, the application may be a component object model (COM) plugin application that executes within another application (e.g., Microsoft Word®), a stand-alone application that natively executes as an application (e.g., a Windows® Presentation Foundation (WPF) application, etc.), or a hosted application that uses another application such as a web browser to render the user interface (e.g., Native React, Electron JS, Blazor WebWindow, etc.). In some examples, the application can be web application (e.g., a Microsoft 365® add-in) that is side loaded into a local application (e.g., Microsoft Word) or a web application (e.g., Microsoft 365®) and uses an API to perform functions.

The client 302 may execute the application at step 310. As noted above, the application may be executed within a browser's sandbox. However, the application may also be an add-in and executes within another application such as a React-based add-in that is executed within Microsoft Word® and is able to use various APIs to interact with the document and the application. In the example illustrated in FIG. 3, the system 300 is presumed to execute in a browser sandbox, and any descriptions in FIG. 3 may be modified or changed based on the execution environment of the application.

At step 312, the application transmits the document including at least one claim to the server. As noted above, FIG. 3 may be modified based on the execution environment. As an example, if the application is a React add-in that is executing within Microsoft Word, at step 312 the application may, using an API available via the application (Office.js, etc.), retrieve the text corresponding to the claims and transmit the text to the NLP server 306.

After receiving the document, the server 304 extracts text from the claims at step 314 and transmits text from the claims at step 316 to the NLP server 306. For example, the claim generally is separated by line breaks and may include whitespace (e.g., spaces, tabs, line breaks, etc.) to illustrate relationships of subject matter in the claims. The margins, indenting, and other paragraph properties can also be used to identify relationships in the claims. Accordingly, identification information of the claim is also extracted and transmitted to the NLP server at step 316. For example, the identification information may be the claim number and claim line encoded into a unique value, and the text may be transmitted as a key-value pair at step 316. The NLP server 306 processes the text into NLP tokens at step 318 and transmits the tokens and token identification information to the server at step 320. The NLP server 306 generates token identification information to indicate a position of the token in the input text and to identify token relationships based on the various token properties (e.g., dependency label, part of speech, etc.).

At step 322, the server 304 generates token IDs, analyzes the NLP tokens, and creates new text at step 322. In particular, the server 304 generates a token identifier for each token based on the identification information and token identification information. Thus, the server 304 generates a unique token identifier for each token based on the claim number of the token, the line number (based on the line breaks), and a position of the token within that line. As will be described below, the token IDs generated by the server 304 allow supplemental NLP analysis of different segments to improve quality of the NLP.

The NLP analysis of the line of text may materially be affected based on common terms that are commonly used in patent claims. For example, the term "wherein" may significantly affect the NLP analysis and cause the NLP to misidentify the root word. As noted above, the root word of a phrase or sentence is not dependent on any other tokens. Further, terms such as "comprising" have specific legal definitions and may also affect the quality of the NLP analysis. Thus, at step 322, the server may analyze the tokens and determine that a line of a claim should be segmented into different claim segments and then reanalyzed. The claim segments are a consecutive list (i.e., an array) or NLP tokens that can be converted into individual sentences by the system 300 and generally form discrete concepts.

The claim segments are generally classified into an active phrase, a passive phrase, and a linking phrase. An active phrase includes a root word that is a gerund verb. As an example, a segment that forms the phrase "transmitting information" comprises a token "transmitting" that has a dependency label of root and a second "information" that has a dependency label of clausal subject. In this example, because the system 300 receives method claims, the root verbs will generally be gerund verbs. However, the system 300 could receive present tense verbs and segment the claims in a substantially identical manner. In some examples, there may be an adpositional phrase (e.g., "after receiving the content," "in response to receiving the content, etc.) that modifies the root verb. However, the core meaning of the segment still corresponds to the active gerund verb and the root token can be deduced based on an analysis of the NLP tokens. The active phrase generally includes a direct object linked to the gerund verb and does not include a noun having a dependency label of nominal subject.

A passive phrase includes a subject that that further defines a concept in another active phrase and generally includes both a nominal subject and a clausal subject. In this case, the root word may be a present tense or past tense verb. However, the verb can also be in active form. For example, a segment that forms the passive phrase "the information includes a power transmission level" comprises a root word of "includes," which a present tense verb. However, "the information" is a singular noun that has a dependency label of nominal subject and "a power transmission level" is a clausal subject.

A linking phrase does not include content and provides context that links two claim segments. As an example, the linking phrase "the processing of the data comprises" further indicates that content after the linking phrase is linked to and modifies "processing the data."

Accordingly, the server 304 creates portions of text by excluding some of the common terms that affect the NLP analysis and transmits the portion of text to the NLP server 306 at step 324. The text transmitted at step 324 may also include identifying information to facilitate synthesis of the NLP tokens. At step 326, the NLP server 306 processes the text into NLP tokens and transmits a second set of tokens to the server 304 with the identification information at step 328. The identification information transmitted to the NLP server 306 at step 324 may be different than identification information transmitted at step 316. For example, text transmitted at step 324 may be in the form of a key-value pair with the key corresponding to the token ID of the first token in the text.

At step 330, using the identification information, the server 304 synthesizes the first set of tokens and the second set of tokens into a complete set of tokens in step 320. The complete set of tokens corresponds to the entirety of the claim and includes the common terms. With the NLP tokens synthesized, the server 304 transmits the complete set of tokens to the client 302 (i.e., the application executing on the client 302) at step 332.

The client application, which will be further described below with respect to FIG. 5, allows the NLP tokens to be rearranged in a flowchart user interface based on user input. However, in some cases, the steps that should be illustrated in a flowchart are not necessarily explicit in a claim. For example, if a claim is a condition-action sequence (e.g., if something exists, perform a function), the claim implicitly recites two actions: the determining of the condition and the action that is performed based on the condition. Therefore, in some cases, it is beneficial to allow a user to input additional actions that should be incorporated into a flowchart and its corresponding description.

Accordingly, to allow the user to add additional content (i.e., nodes) to the flowchart user interface, the application may allow the user to input additional language. That is, the application enables the user to input supplemental text that is separate from the text of the claims at step 334. In response, the application executing on the client 302 may transmit the supplemental text to the server 304 at step 336. The server 304 transmits the text to the NLP server 306 at step 338. In this case, the server does not provide identifying information because the server 304 will not necessarily need to resynthesize the NLP tokens. The NLP server 306 processes the text into NLP tokens at step 340 and transmits the tokens to the server at step 342. The server 304 transmits the tokens to the client 302 at step 344.

At step 346, the client 302 selects at least one template that is used to configure a patent specification. However, step 346 is only illustrated as an example and can occur prior to claim analysis and tokenization described above or at other stages of the present technology. In response to the user's selection of at least one template at step 346, the client 302 transmits a request for the template to the server 304 at step 348. The server 304 replies with the at least one template at step 350. The template includes static information that may be updated based on the user's manipulation of the client application. For example, a template can include standard boilerplate, a blank drawing that is inserted to be a placeholder, a flowchart description style, a client specific drawing that is relevant to many of that particular client's patent applications, and so forth.

In some examples, the template may insert the content into multiple sections of the patent specification. As an example, a template that is related to blank diagram that serves as a placeholder (i.e., for preserving of reference numbers and other labels) may only insert a blank description into a drawing description section and a description section. However, a client specific system overview may include different regions related to background, technical field, summary, and description. Further, the templates may include a corresponding section that identifies entities associated with the claims. As will be described in further detail below, the entities may be hardware components that the user can link to via a claim segment, which may also be used to compose new claims based on the method claims input into the system 300.

At step 352, the user operates the application on the client 302 to generate specification data. As an example, a flowchart user interface is presented to the user and allows the user to organize claim segments in a manner that will be used to visually describe the flowchart, which will be further described below with respect to FIGS. 6 to 10. Further, as noted above with respect to step 346, the user is able to select different templates, perform client specific functions, and so forth to generate the specification data. The specification data may include different data structures that are used to generate the specification document and may include, for example, user authored claims, application composed claims, a list of templates and data associated with the templates, flowchart data for generating descriptions of the flowchart, descriptions of the flowchart, static data (e.g., docket number, inventor names, client information, etc.) and so forth.

The specification data 354 is transmitted to the server 304 at step 354 because, in this example, the client application is executing within the browser sandbox and is unable to access system resources. Accordingly, the server 304 receives the specification data, generates a document based on the specification data, and generates drawings based on the specification data. The server 304 then transmits the document and drawing to the client 302 at step 358. In other examples, the application may be executing within document processing application (i.e., Microsoft Word®, Libre Office, etc.) and may generate the document on the client 302 itself using an API.

In the example illustrated in FIG. 3, an improved NLP analysis method is described that identifies common terms that causes NLP errors. By further segmenting the text based on the common terms and performing a subsequent NLP analysis, the quality of the NLP analysis is improved and the NLP tokens can be easily dissected into different claim segments that will form complete sentences in the generated patent specification.

Although the above and below disclosure relates to a patent application, the disclosure can also be applicable to content that relates to a sequence of operations. For instance, the disclosure can be applied to a flow diagram illustrating communication between devices, software processes, services, or any other type of communication. The instant disclosure can also be applied to legal and/or formal documents for identifying a sequence, an order, a succession, conditional logic, decision trees, and so forth.

FIG. 4 illustrates an example method 400 for segmenting the text into NLP tokens and claim segments that are used by a client application for creating a patent specification. The descriptions below relate to aspects that can be integral to a user application or separate from the user application (e.g., implemented on a server). For the sake of clarity, the method 400 is described separately from other aspects that relate to the machine-user interface. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method 400 includes transmitting text associated with patent claims to a server for NLP analysis at step 402. For example, the processor 1305 illustrated in FIG. 13 may transmit text associated with patent claims to a server for NLP analysis. In this example, the patent claims comprise an independent claim and at least one dependent claim that form a set of claims. While it is possible to use a single independent claim, a set of claims generally includes at least one dependent claim.

According to some examples, the method 400 includes receiving NLP tokens from the server based on the NLP analysis at step 404. For example, the processor 1305 illustrated in FIG. 13 may receive NLP tokens from the server based on the NLP analysis.

According to some examples, the method 400 includes generating a token identifier for each NLP token at step 406. For example, the processor 1305 illustrated in FIG. 13 may generate a token identifier for each NLP token. In an example, the token identifier includes a claim number, a line number, and a token number within the line. In particular, the claim number, line number, and token number are each encoded into the token identifier using different base numbers or Gödel numbering. The token number within the line indicates an order of the token within the line.

According to some examples, the method 400 includes identifying common terms in the NLP tokens that affect the NLP analysis at step 408. For example, the processor 1305 illustrated in FIG. 13 may identify common terms in the NLP tokens that affect the NLP analysis. In an example, the common terms comprise at least one of comprising, comprises, and a phrase to indicate a definition. In another example, the common terms comprises patent terms having a legal definition or provide a context for a claim segment and further explain the content of the claim.

According to some examples, the method 400 includes, in response to identifying the common terms, generating segments of text based on the common terms and transmitting the segments of text to the server for a second NLP analysis at step 410. For example, the processor 1305 illustrated in FIG. 13 may, in response to identifying the common terms, generate segments of text based on the common terms and transmit the segments of text to the server for a second NLP analysis.

According to some examples, the method 400 includes receiving a second set of NLP tokens from the server based on the second NLP analysis at step 412. For example, the processor 1305 illustrated in FIG. 13 may receive a second set of NLP tokens from the server based on the second NLP analysis.

According to some examples, the method 400 includes synthesizing the NLP tokens and the second set of NLP tokens into a complete set of NLP tokens corresponding to the text associated with the patent claims at step 414. For example, the processor 1305 illustrated in FIG. 13 may synthesize the NLP tokens and the second set of NLP tokens into a complete set of NLP tokens corresponding to the text associated with the patent claims. In an example, the passive phrase includes a present tense verb and a nominal subject. In another example, the active phrases comprise a gerund verb that corresponds to a root word of the claim segment based on the NLP analysis. In another example, the passive phrase further defines a gerund verb or an object in another claim segment. In a fourth example, the generating of the claim segments comprises identifying content that links different claims and identifying linking phrases that link different claim segments. In a fifth example, each claim segment corresponds to an active phrase or a passive phrase. In a sixth example, the complete set of NLP tokens includes claim segments, each claim segment comprising a plurality of NLP tokens. In a seventh example, the common terms are excluded from any of the claim segments.

In another example, the synthesizing of the tokens at step 414 comprises identifying a relationship between different claim segments based on the linking phrases. For example, the processor 1305 illustrated in FIG. 13 may identify a relationship between different claim segments based on the linking phrases. A linking phrase does not include content, but simply provides context that links two segments. For example, a preamble of a claim may include "the processing of the data comprises," which further indicates that content after preamble is a linked to and modifies "processing the data."

According to some examples, the method 400 includes extracting whitespace for each line of the patent claims at step 416. For example, the processor 1305 illustrated in FIG. 13 may extract whitespace for each line of the patent claims. Based on procedural requirements, a claim is required to be a single sentence, but a claim is generally broken into individual lines using a line break to provide structure to the claim and separate different clauses. Whitespace includes spaces, tabs, line breaks that may be used to provide visual formatting to the claim. In terms of document file formats, the underlying text may be separated into several different XML elements and whitespace may be represented by properties of the XML elements. As an example, a paragraph element is represented in OpenXML (i.e., a word .docx file) as a <w:p> element with the "w" identifying the namespace and the "p" identifying a paragraph element. The paragraph element can include child XML elements such as a paragraph properties element (i.e., a <w:pPr> element) that provides whitespace such as, the indent of the first line, the left margin, a tab element, a hanging indent, etc.

According to some examples, the method 400 includes identifying relationships between the claim segments based on the whitespace, a claim number associated with the claim segment, and a claim dependency at step 418. For example, the processor 1305 illustrated in FIG. 13 may identify relationships between the claim segments based on the whitespace, a claim number associated with the claim segment, and a claim dependency. Further, claim lines (or recitations) may include whitespace to further indicate that the recitation is related to the prior subject matter in the claim.

According to some examples, the method 400 includes determining an order of a portion of the claim segments based on the relationships of the claim segments, the order corresponding to an order of a flowchart that is presented to a user, at step 420. For example, the processor 1305 illustrated in FIG. 13 may determine an order of a portion of the claim segments based on the relationships of the claim segments, the order corresponding to an order of a flowchart that is presented to a user.

In an example, the user provides input into the flowchart to generate a portion of the specification data. According to some examples, the method 400 includes receiving supplemental text that is input separately from the claims at step 422. For example, the processor 1305 illustrated in FIG. 13 may receive supplemental text that is input separately from the claims. For example, the user may enter text into a component to create a user-defined segment for the flowchart user interface as described below.

According to some examples, the method 400 includes transmitting the supplemental text to the server at step 424. For example, the processor 1305 illustrated in FIG. 13 may transmit the supplemental text to the server.

According to some examples, the method 400 includes receiving a third set of NLP tokens from the server corresponding to the supplemental text at step 426. For example, the processor 1305 illustrated in FIG. 13 may receive a third set of NLP tokens from the server corresponding to the supplemental text.

According to some examples, the method 400 includes receiving specification data generated based on user manipulation of the claim segments at step 428. For example, the processor 1305 illustrated in FIG. 13 may receive specification data generated based on user manipulation of the claim segments. The specification data is generated based on user input into a client application to rearrange the initial ordering of the claim limitations that were originally determined based on the NLP analysis and logical analysis described above. A method associated with the creating the specification data is illustrated in FIG. 5 and examples of the user interface and corresponding features are illustrated in FIGS. 6 to 10 and further described below.

Figure 10:
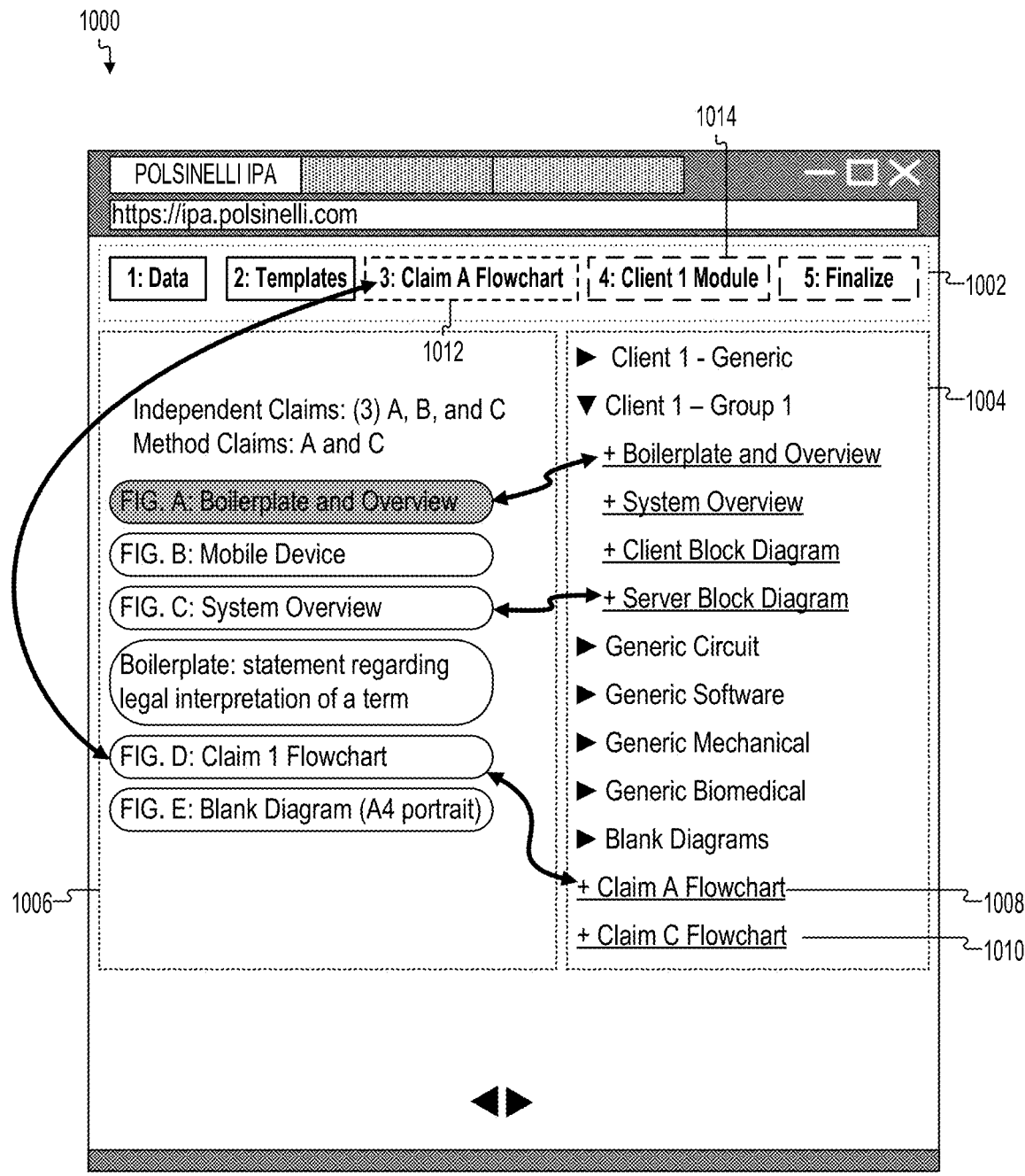
FIG. 10 illustrates a user interface that allows a user to build a specification using point and click operations in conjunction with a client-specific module.
Figure 12:
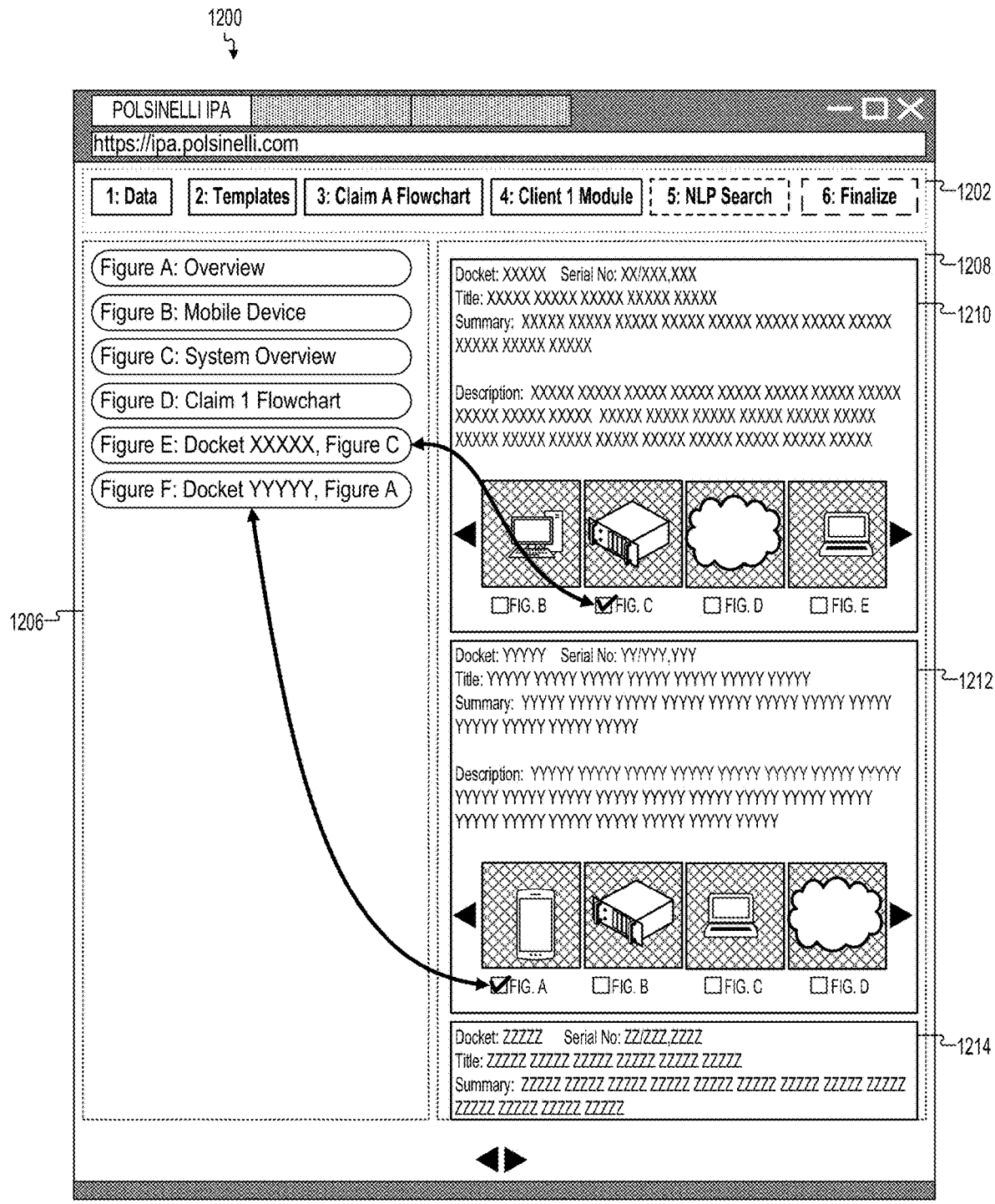
FIG. 12 illustrates an example user interface for generating a specification based on a related application that is identified using NLP.

In an example, the specification data comprises flowchart data that is generated at the client application based on user manipulation. In some examples, the specification data identifies a list of templates and data related to the templates (e.g., Figure number) as illustrated in FIGS. 10 and 12. The specification data includes different data that is generated by the client 302 and is used by the server 304 to generate the specification.

According to some examples, the method 400 includes generating a patent specification that comports with a plurality of procedural requirements based on the specification data at step 430. For example, the processor 1305 illustrated in FIG. 13 may generate a patent specification that comports with a plurality of procedural requirements based on the specification data. The patent specification can also include a set of drawings.

In an example, the generating of the specification at step 430 may include determining that the specification data includes custom content for a first template in a list of templates. For example, the processor 1305 illustrated in FIG. 13 may determine that the specification data includes custom content for a first template in the list of templates. In another example, the generating of the specification at step 430 further comprises extracting first content from a document corresponding to the first template.

In another example, the generating of the specification at step 430 comprises generating text in a description section of the patent specification based on at least one claim. For example, the processor 1305 illustrated in FIG. 13 may generate text in a description section of the patent specification based on at least one claim. The description in this case corresponds to the flowchart description of a drawing and specifically links the description to the flowchart with a reference numeral.

Figure 6:
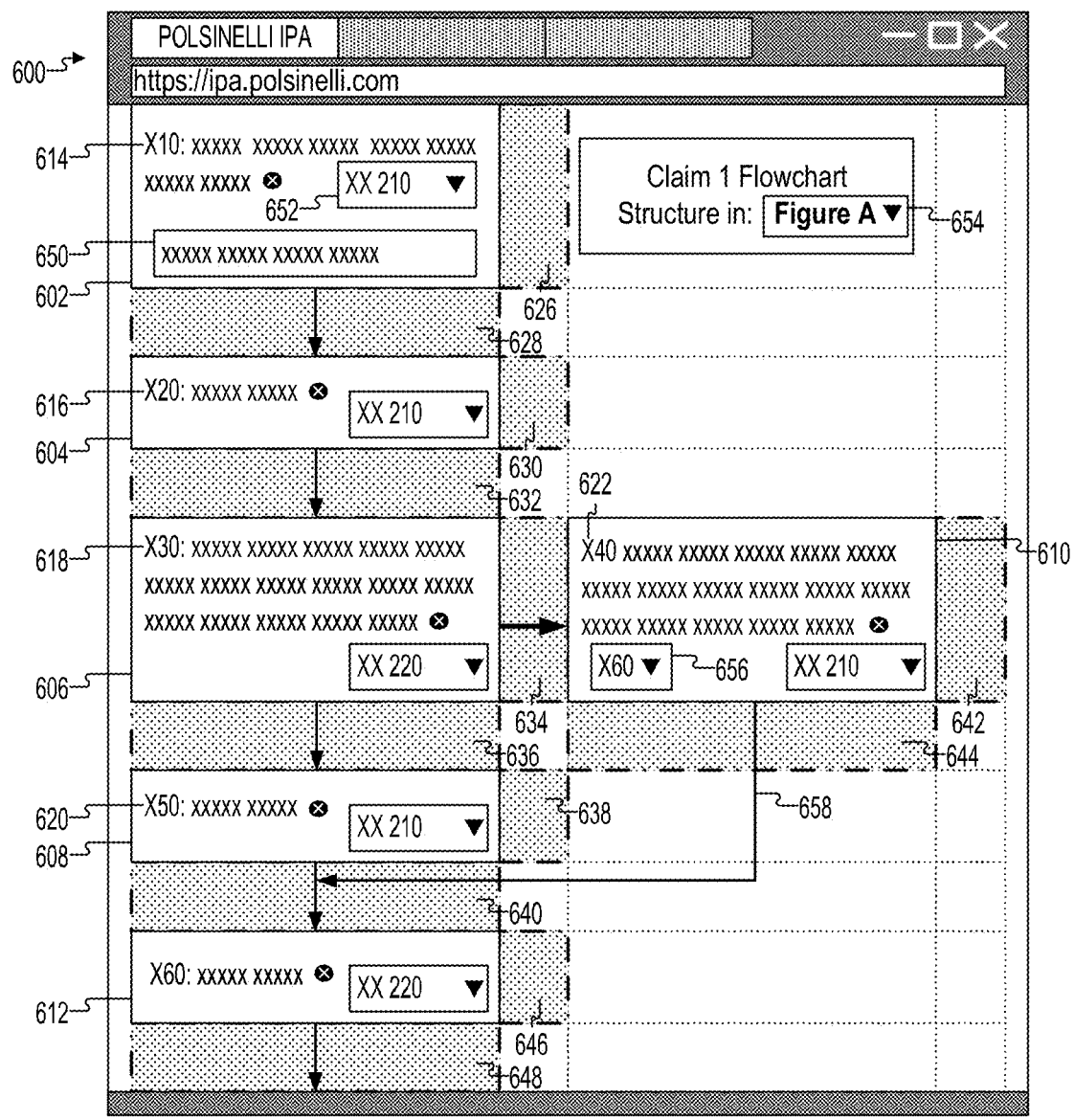
FIG. 6 illustrates an example user interface for arranging claim segments to generate a patent specification and drawings.
Figure 7:
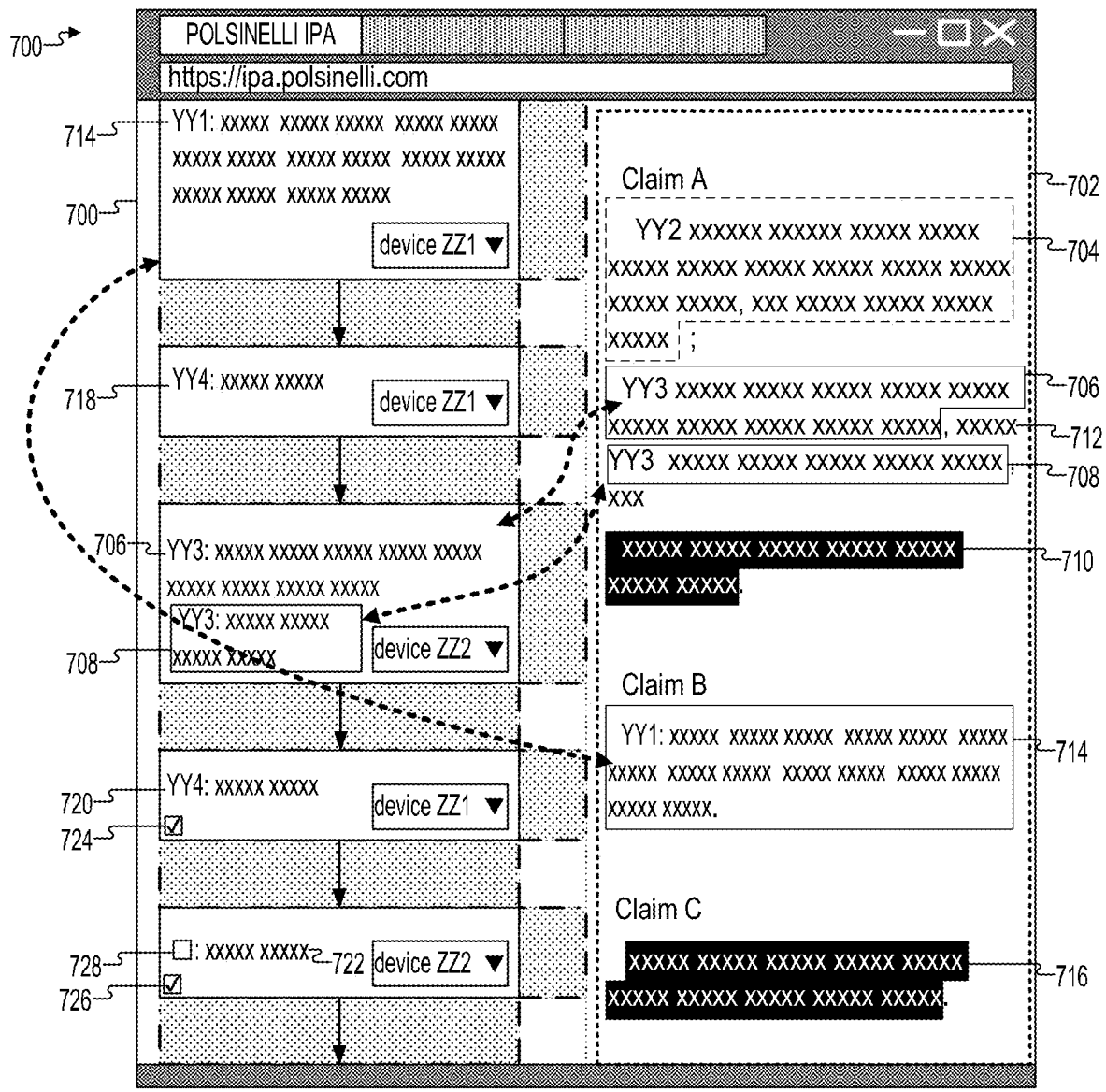
FIG. 7 illustrates an example user interface for arranging claim segments using a claim panel that simultaneously displays claim segments and claims based on a feedback scheme.

Further, the generating the specification at step 430 further includes determining whether the specification data indicates that a claim segment is linked to a structure that performs an action corresponding to the claim segment. After determining a claim segment is linked, the method further includes generating text corresponding to the claim segment that indicates that the structure performing the action of the claim segment. For example, the processor 1305 illustrated in FIG. 13 may determine whether the specification data indicates that a claim segment is linked to a structure that performs an action corresponding to the claim segment and may generate text in the flowchart description that indicates the structure performing the action of the claim segment. The action of the text has a different verb tense than the action in the claim segment and the text includes a reference numeral of the structure that identifies the structure in a drawing. Thus, as illustrated in FIGS. 6 and 7, the specification is generated based on a user input into the user interfaces (e.g., the control 652 in FIG. 6) that links a hardware diagram to a claim segment in the flowchart user interface. In particular, when generating the description related to the flowchart, the description identifies the step in the flowchart and provides explicit support to a hardware structure that also performs this step.

The generating the specification at step 430 further includes synthesizing the first content and the custom content into merged content for inserting the merged content into the generated patent specification. For example, the processor 1305 illustrated in FIG. 13 may synthesize the first content and the custom content into merged content. For instance, based on previous input identifying a specific structure in the client application, the corresponding action in the flowchart user interface can be inserted into text associated with the hardware. That is, the link used in the control, which is illustrated as control 652 in FIG. 6, can simultaneously generate text for a flowchart and text associated with the hardware figure. For example, if a transmitter X10 is selected to perform "transmitting power level information," the description associated with the transmitter X10 can be modified to indicate that the transmitter X10 transmits the power level information. As noted above, this input can also be used to modify the descriptions of the flowchart, thereby allowing a single user interface to change different content in different sections of the patent specification.

However, in some embodiments, processor 1305 can receive an input that will indicate at that at least one claim from the input claims should be excluded from a claim section of the patent specification. This results in a claim being be used to generate text for the description, but is expressly excluded from the claims in the specification generated at step 430. This can be a beneficial feature whereby an input claim set can articulate all concepts that a user desires to be processed by NLP server 130 and included in the patent document, while focusing the claim set with the most useful claims in the claim set.

In another example, the generating of the patent specification at step 430 comprises generating a preliminary amendment based on the specification data. For example, the processor 1305 illustrated in FIG. 13 may generate a preliminary amendment based on the specification data. Similar to the second example, additional claims can be used generate the specification, but can be removed via preliminary amendment to prevent incurring excess claim fees.

According to some examples, the method 400 includes transmitting the patent specification to a client application that generates the specification data at step 432. Further, the method 400 can also transmit a set of drawings to the client. For example, the processor 1305 illustrated in FIG. 13 may transmit the patent specification to a client application that generates the specification data. In some cases, the method 400 may be executing locally on a client machine and the client machine would therefore create the document or insert the content of the patent specification into an existing document that is open in a word processing application.

While the above discloses improves NLP analysis, despite the general proficiency of the NLP server in understanding language structure, the NLP server is not always able to arrange claim segments in an optimal order for explaining an invention embodied in claims. In some instances, these limitations of the NLP server are rooted in the formal structure of claims, and that an aim of the drafters is for the claims to be only minimally descriptive of an invention (e.g., claims are intended to define a minimum novelty to result in a patentable claim that provides the broadest rights to which the applicant is entitled). In view of both these technological limitations and the limitations of the input provided to the NLP server, the present technology provides an interface to receive inputs to rearrange the initial ordering of the claim limitations that were originally determined by NLP server and to include supplemental text in addition to the language in the input claims.

Figure 5:
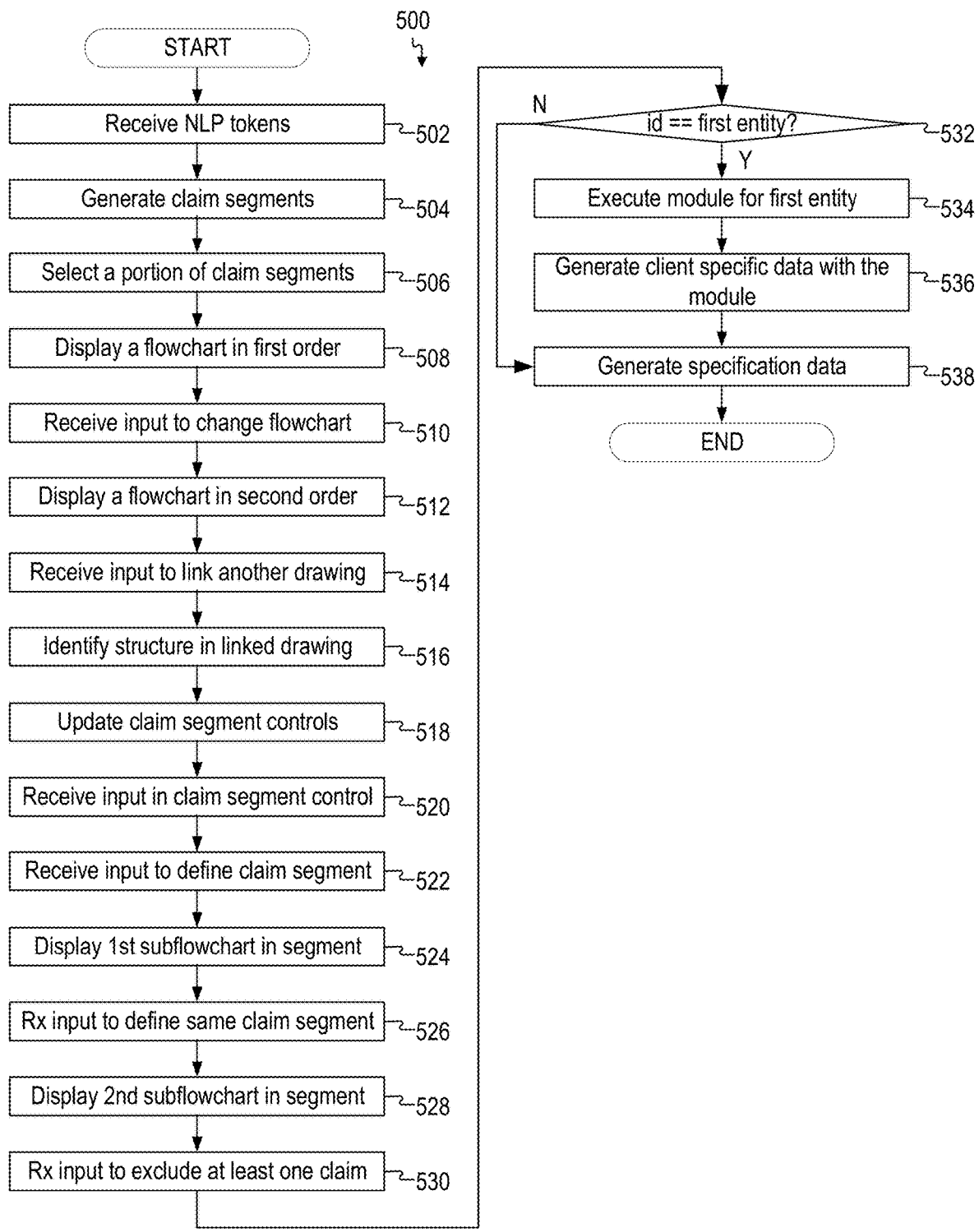
FIG. 5 is a flowchart of a method for sequencing claim segments to generate a patent specification.

FIG. 5 illustrates an example method 500 for sequencing claim segments to generate a patent specification using examples of various aspects of a dynamic user interface illustrated in FIGS. 6 to 10. For purposes of clarity, the descriptions below relate to a client application that is executing and outputting a flowchart user interface to allow the user to visually draft the patent specification.

Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some examples, the method includes receiving NLP tokens from an NLP analysis of patent claims at step 502. For example, the processor 1305 illustrated in FIG. 13 may receive NLP tokens from an NLP analysis of patent claims. In an example, the patent claims comprise an independent claim and at least one dependent claim that form a set of claims.

According to some examples, the method 500 includes generating claim segments from the NLP tokens at step 504. For example, the processor 1305 illustrated in FIG. 13 may generate claim segments from the NLP tokens. In another example, each claim segment corresponds to an active phrase or a passive phrase. The passive phrase further defines a gerund verb or an object in another claim segment. In another example, the active phrase comprises a gerund verb that corresponds to a root word of the claim segment based on the NLP analysis.

According to some examples, the method 500 includes selecting a portion of claim segments to display at step 506. For example, the processor 1305 illustrated in FIG. 13 may select a portion of claim segments to display.

According to some examples, the method 500 includes displaying a flowchart including the portion of the claim segments arranged in a first order at step 508. For example, the processor 1305 illustrated in FIG. 13 may display a flowchart including the portion of the claim segments in the first order. An example of a flowchart displaying an order of claim segments is illustrated in FIGS. 6 and 7.

In another example, the method 500 comprises displaying a claim area that illustrates the set of claims and claim segments corresponding to the set of claims. For example, the processor 1305 illustrated in FIG. 13 may display a claim area 702. An example claim area 702 is depicted in FIG. 7 and provides visual feedback to facilitate user operation.

According to some examples, the method 500 includes receiving an input to change the first order of the claim segments into a second order that is different from the first order at step 510. For example, the processor 1305 illustrated in FIG. 13 may receive an input to change the first order of the claim segments into the second order that is different from the first order. As further described below with reference to FIGS. 6, 7, 8, 9A, 9B, and 9C, the user interface allows the user to drag and drop claim segments in the flowchart to form complex relationships. The user input can also be other operations such as a click operation that in a conditional branch that identifies the order of claim segments.

In an example, the input comprises dragging the second claim segment into the flowchart, and, after the second claim segment is dragged into the flowchart, a first graphical demarcation is applied to the second claim segment in the claim area. In another example, the input comprises dragging the third claim segment into the flowchart, and, after the third claim segment is dragged into the flowchart, the first graphical demarcation is applied to the third claim segment in the claim area.

The demarcations is the flowchart user interface provide visual information regarding a state of the claim segment. This visual information allows the user to understand the organization of the flowchart to understand how the flowchart itself will be used to draft the patent specification.

For example, FIG. 7 illustrates a first graphical demarcation (indicated by the border) applied to claim segments 706, 708, and 714 and indicates that each claim segment is displayed in the flowchart user interface (i.e., the executing application and not the patent application or corresponding drawings). In another example, FIG. 7 illustrates a second graphical demarcation applied to a claim segment 704 in the claim area indicates that the claim segment 704 comprises active language and is not displayed in the flowchart. In another example, FIG. 7 illustrates a third graphical demarcation applied to a claim segments 710 and 716 in the claim area indicates that each segment comprises passive language and is not displayed in the flowchart.

According to some examples, the method 500 includes displaying the claim segments in the flowchart in the second order at step 512. For example, after receiving an input effective to indicate a rearrangement of the claim segments, the processor 1305 illustrated in FIG. 13 may display the claim segments in the flowchart in the second order.

According to some examples, the method 500 includes receiving an input to link another drawing with the current flowchart at step 514. For example, the processor 1305 illustrated in FIG. 13 may receive an input to link another drawing with the current flowchart. For example, FIG. 6 below illustrates a control 654 that allows selection of another drawing which will permit cross reference between the flow chart and the another drawing when the patent specification is later created.

According to some examples, in response to the input at step 514, the method 500 includes identifying a structure in the linked drawing. For example, the processor 1305 illustrated in FIG. 13 may identify a structure in the linked drawing. For instance, a template file associated with the drawing may identify a plurality of structures that are selectable in the user interface.

According to some examples, the method 500 includes updating controls associated with the claim segments at step 518. For example, the processor 1305 illustrated in FIG. 13 may update controls associated with the claim segments. In an example, the structures identified in the template file may populate the controls located in the nodes to allow selecting of a structure that performs the action corresponding to the claim segment.

According to some examples, the method 500 includes receiving an input in a control associated with a claim segment at step 520. For example, the processor 1305 illustrated in FIG. 13 may receive an input in a control associated with a claim segment. In response to receiving the input, the claim segment corresponding to the control is then associated with performing the action. Accordingly, when the text of the patent specification is generated based on the specification data, the text will explicitly link the action associated with the claim segment with the structure. For example, FIG. 6 illustrates controls 652 that allows linking a structure to a claim segment that a user can select different structures based on the drawing selected in control 654.

Figure 8:
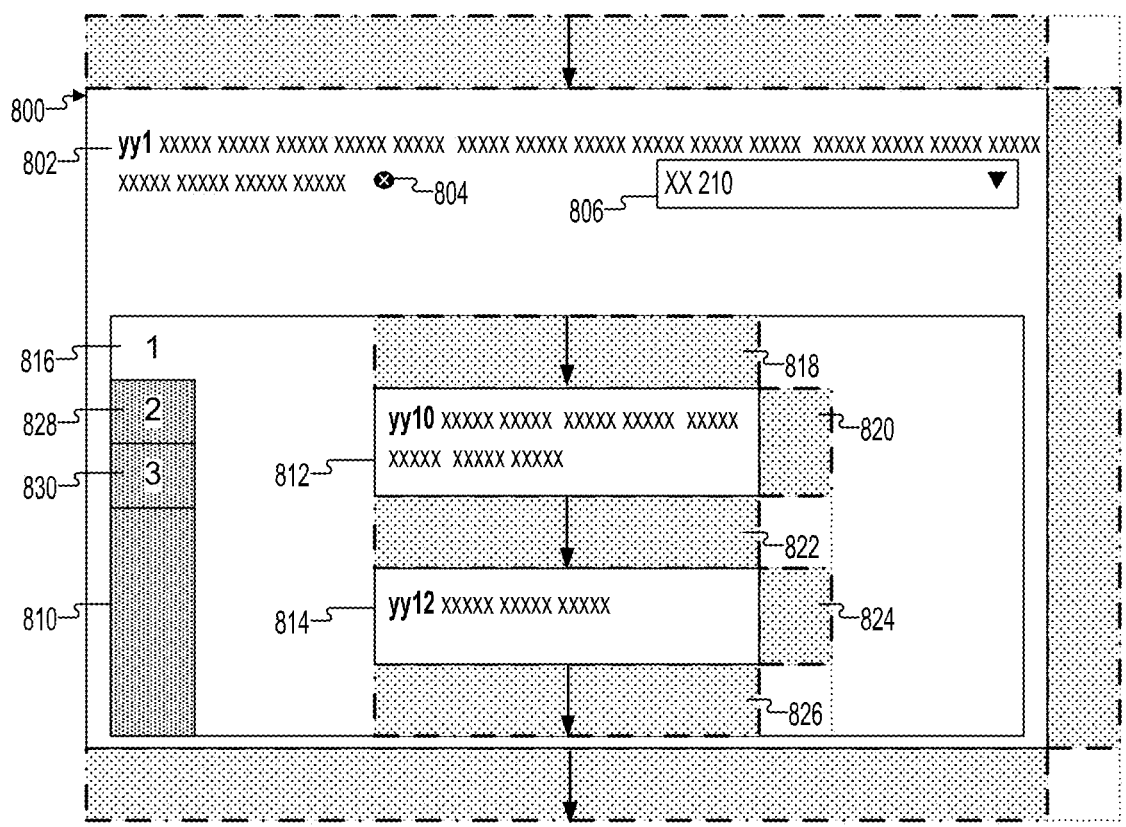
FIG. 8 illustrates an example node that allows complex manipulation of claim segments.

According to some examples, the method 500 includes receiving a second input to indicate that language of a second claim segment partially defines a first claim segment that is displayed within the flowchart at step 522. For example, the processor 1305 illustrated in FIG. 13 may receive a second input to indicate that the language of a second claim segment partially defines a first claim segment that is displayed within the flowchart. For example, as described below, FIG. 8 illustrates that claim segment 812 and claim segment 814 can be dragged into a node 800 to further define claim segment 802 of the node 800.

According to some examples, the method 500 includes displaying a first sub-flowchart within the first claim segment in the flowchart at step 524. For example, the processor 1305 illustrated in FIG. 13 may display a first sub-flowchart within the first claim segment in the flowchart. In an example, a first drawing is generated from the specification data that corresponds to the flowchart and a second drawing is generated from the specification data that corresponds to the first sub-flowchart. In this first example, the first sub-flowchart further defines the action associated with the first claim segment. For example, FIG. 8 illustrates a sub-flowchart that further defines claim segment 802.

According to some examples, the method 500 includes receiving a third input to indicate that the language of a third claim segment partially defines the first claim segment displayed within the flowchart at step 526. For example, the processor 1305 illustrated in FIG. 13 may receive a third input to indicate that the language of a third claim segment partially defines the first claim segment displayed within the flowchart.

According to some examples, the method 500 includes displaying a second sub-flowchart within the first claim segment in the flowchart at step 528. For example, the processor 1305 illustrated in FIG. 13 may display a second sub-flowchart within the first claim segment in the flowchart. In an example, a first drawing is generated from the specification data that corresponds to the flowchart, a second drawing is generated from the specification data that corresponds to the first sub-flowchart, and a third drawing is generated from the specification data that corresponds to the second sub-flowchart. In this example, the second sub-flowchart also further defines the action associated with the first claim segment. Thus, the first sub-flowchart and the second sub-flowchart may be different species and may be mutually exclusive and multiple drawings may be generated based on the input into the flowchart user interface. As an example, FIG. 8 illustrates a tabbed interface for allowing different sub-flowcharts to be associated with a single claim segment 802.

According to some examples, the method includes receiving an input to select at least one claim from the set of claims at step 530. For example, the processor 1305 illustrated in FIG. 13 may receive an input to select at least one claim from the set of claims. In an example, at least one claim is excluded from a claim section of the patent specification. As noted above, this results in a claim being be used to generate text for the description, but is expressly excluded from the claims in the specification.

According to some examples, the method 500 includes determining whether an identifier for the patent specification corresponds to a first entity at step 532. For example, the processor 1305 illustrated in FIG. 13 may determine whether an identifier for the patent specification corresponds to a first entity. As will be described below with reference to FIG. 10, the identifier is used to execute a client-specific module 1014 to perform common events that are particular to that client. For example, a first client may require multiple timing diagrams, a second client may require a circuit diagram having a similar layout, and a third client may require an engine illustration that requires different labels.

According to some examples, the method 500 includes, when the identifier corresponds to the first entity, executing a module exclusively associated with the first entity at step 534. For example, the processor 1305 illustrated in FIG. 13 may, when the identifier corresponds to the first entity, execute a module exclusively associated with the first entity.

According to some examples, the method 500 includes, in response to user input into the module, generating client specific data based on the module. For example, the processor 1305 illustrated in FIG. 13 may, in response to user input into the module, generate a portion of the specification data based on the module, the portion of the specification data be used to generate a drawing specific to the first entity. In one example, the client specific data is used to generate a drawing and a corresponding description specific to the first entity at step 536.

According to some examples, the method 500 includes generating specification data used to create a patent specification. The patent specification includes a description of the flowchart based on the second order at step 538. Further, the specification data may include the client specific data generated at step 536. For example, the processor 1305 illustrated in FIG. 13 may generate specification data used to create a patent specification, the patent specification including a description of the flowchart based on the second order. The specification data includes all data necessary for generating a specification. For instance, the specification data may identify at least one template that is used to generate a description and drawings. The specification data may also include text generated at the client application that can be injected into the at least one template. As noted above, the drawing may include a flowchart and at least one sub-flowchart that further defines nodes within the flowchart. In another example, multiple flowcharts may be generated based on using a bypass node, which is described below in connection with FIGS. 9A to 9C.

In an example, the generating of the specification data comprises composing a device claim based on the independent claim. In another example, the device claim includes the text indicating that the structure performs the action corresponding to the first claim segment. In another example, the specification data includes data related to a preliminary amendment that is created to cancel at least one claim from the set of claims. In another example, the specification data comprises settings data related to options for controlling the generation of the patent specification. For example, the settings data may comprise any variation of the specification such as using "Figure" in lieu of "FIG," or any other stylistic preference. For example, the setting data may include a flag indicating two spaces between sentences. In general, the settings data is generally based on preferences. However, the settings data may also include content related to generating the various descriptions of the flowcharts. For instance, the flowchart may be described in a breadth first or a depth first manner. In other examples, the settings data initially set in the application based on another template file that forms the underlying document for a particular client and includes data such as header text for the various headers in the specification, fonts, styles, margins, etc. As noted above, the specification data is used by an application or a server to generate a specification and drawings.

In addition, the method 500 may include additional steps not explicitly identified above. For instance, the method 500 may include identifying a first occurrence of a noun object (i.e., an n-gram) within the claim segments based on the order of the claim segments. In this case, the method 500 may insert language to indicate to the user to add additional description regarding this term.

FIG. 6 illustrates an example user interface 600 for arranging claim segments to generate a patent specification and drawings. In this example, the application is executing in the browser environment. However, the application could be a stand-alone application that natively executes in the operating system or an application add-in (e.g., a Microsoft Word® add-in).

As illustrated in FIG. 6, the rendered view from the browser displays the user interface 600 that corresponds to a flowchart user interface. The user interface comprises a grid having a plurality of nodes (i.e., processes and other operations within the flowchart) and edges (i.e., arrows) between the nodes to illustrate a flowchart. In particular, node 602, node 604, node 606, node 608, node 610, and node 612 are displayed in the grid. Although not illustrated, the user interface 600 may include start and end nodes.

Each node illustrated in FIG. 6 is associated with at least one claim segment. Specifically, claim segment 614 is displayed via node 602, claim segment 616 is displayed via node 604, claim segment 618 is displayed via node 606, claim segment 620 is displayed via node 608, claim segment 622 is displayed via node 610, and claim segment 624 is displayed via segment 612. In this example, the nodes serve as visual containers for the claim segments, enable complex user inputs, and allow complex associations of the claim segments to be simultaneously formed and displayed.

Each node displayed in FIG. 6 is associated with at least one drop zone for receiving a claim segment as an input and change an order of the flowchart illustrated in the user interface 600. In general, each node includes a drop zone below the node and a drop zone adjacent to the node. Specifically, node 602 is associated with drop zone 626 and drop zone 628, node 604 is associated with drop zone 630 and drop zone 632, node 606 is associated with drop zone 634 and drop zone 636, node 608 is associated with drop zone 638 and 640, node 610 is associated with drop zone 642 and drop zone 644, and node 612 is associated with drop zone 646 and 648.

The drop zones simultaneously provide a visual order to the flowchart and also enable dragging and dropping of segments to reorder the flowchart. As an example, drop zone 626 and drop zone 628 are associated with node 602. The drop zone 628 is sequentially links the node 602 to node 604 by virtue of the arrow (i.e., edge) located within the drop zone 628. However, dropping another claim segment into drop zone 628 informs the application that the dropped segment is should be positioned between nodes 602 and 604. Thus, the drop zones allow a claim segment to be dragged and dropped into the corresponding drop zone, which inserts the claim segment at the corresponding location and allows the user to manipulate the claim segments to visually construct a flowchart using claim segments.

FIG. 6 illustrates claim segment 618 as a node preceding claim segment 620. FIG. 6 also illustrates that claim segment 622 is displayed as a branch of claim segment 618. This branch is the result of claim user interface 600 receiving a drag and drop of segment 622 into drop zone 634. Thus, at claim segment 618, the method illustrated in the user interface 600 can proceed to either claim segment 620 or claim segment 622. As illustrated in FIG. 6, after this drop event, the user interface 600 has created an additional column in the user interface 600 for displaying the claim segment 622. After this drop event has occurred, a drop event could still be received in drop zone 634 to position another claim segment between claim segment 618 and claim segment 622. Similarly, a claim segment can be received into drop zone 636 to cause the claim segment to be positioned between claim segment 618 and claim segment 620.

The user interface 600 also allows the complex display of the various claim segments. For example, a passive claim segment 650 may be displayed within node 602 to visually illustrate that the passive claim segment 650 further defines subject matter within claim segment 614. To position the passive claim segment 650, claim segment 650 is dragged and dropped into claim segment 614. However, as will be described below with reference to FIG. 8, dropping an active claim segment into claim segment 614 will create an embedded sub-flowchart within the node 602.

The node 602 may also illustrate a control 652 for selecting a device that performs the action in claim segment 614. The user interface 600 also includes a control 654 that allows a corresponding figure to be selected. Using the control 654, the user is able to select the figure (e.g., Figure A in this example) that includes a list of structures (e.g., XX 210 selected in control 652, XX 220 selected in node 606, etc.) that can populate the control 652. By selecting the control 652, the claim segment 614 can be linked to structures in different drawings in connection with generating the patent specification.

That is, the user interface 600 displays a flowchart user interface that allows the user to intuitively drag and drop various claim segments in a simple manner. As such, the user is able to quickly and accurately order the claim segments, which also changes the underlying data structure and affects how the description of the flowchart will be written by the application. In addition, the control 652 and control 654 allow the user to select a hardware figure and corresponding structure, which will be used to generate the specification. In other examples, by selecting the structure via the control 652 and control 654, a claim can be composed to include that the selected structures perform the corresponding action.

Nodes within conditional branches may also include an additional control for identifying a return node and creating a return arrow 658 that illustrates the flow of the method. In FIG. 6, node 622 is the final node of the branch and therefore includes a return control 656 to indicate the next node within another branch. In FIG. 6, the node 622 has been changed to return the flow of the illustrated method to label X60 corresponding to node 612.

FIG. 7 illustrates an example illustration of a user interface 700 for arranging claim segments and includes a claim panel 702 that displays claim segments embedded within the claims based on a feedback scheme.

In particular, FIG. 7 illustrates three claims (A, B, and C). Claim A includes claim segment 704, claim segment 706, claim segment 708, and claim segment 710. In addition, claim A incudes a common word 712 that is not allocated to any claim segments and any trailing or leading punctuation or whitespace is excluded from the claim segments. Claim B includes claim segment 714 and claim C includes claim segment 716.

The user interface 700 allows the user to drag a claim segment from the claim panel 702 and drop a claim segment as described above with reference to FIG. 6. In particular, claim segment 714 was previously dragged to precede claim segment 706 in the flowchart user interface. Although not illustrated, claim segment 704 is not displayed because it precedes claim segment 714 within user interface 700 and can be viewed by scrolling. For clarity, the dashed lines illustrated in FIG. 7 illustrate claim segment 706, claim segment 708, and claim segment 714 and their respective positions in the user interface 700 and the claim panel 702. The claim segment 706, claim segment 708, and claim segment 714 may also include a label (e.g., a reference numeral) that is used to label each active claim segment in the user interface 700 and the claim panel 702. For instance, claim segment 706 is labeled with YY3 and claim segment 714 is labeled with YY1.

Claim segment 718, which precedes claim segment 714 in the user interface 700, is not illustrated in the claim panel 702 and may either be provided from another claim that is not illustrated in claim panel 702 or may be separately input using, for example, a supplemental segment component for allowing the user to manually create claim segments. Similarly, claim segment 720 and claim segment 722 are not illustrated in the claim panel 702 and may be associated with claims not illustrated in claim panel 702 (i.e., the claims can be viewed if the claim panel 702 is scrolled downward) or may be separately input and are not found within the claims.

Further, the claim segments illustrated in the claim panel 702 may be color coded to provide a visual feedback. In the example illustrated in FIG. 7, when a claim segment is allocated (i.e., assigned a position) within the user interface 700, the claim segment may be coded with a first color. In particular, claim segment 704, claim segment 706, claim segment 708, and claim segment 714 are allocated within the user interface 700 (with claim segment 704 not being viewable based on scrolling the user interface 700). As noted throughout this disclosure, the various claim segments can be added, moved, and removed from the flowchart. When a corresponding claim segment is deleted from the flowchart (using the delete icon), the claim segment is referred to as unallocated.

Claim segment 710 and claim segment 716, which are displayed in the claim panel 702, are not allocated and are color coded to provide additional feedback. In particular, claim segment 710 is coded with a second color to indicate that claim segment 710 is an active phrase and is not allocated within the user interface 700. Claim segment 716 is coded with a third color to indicate that claim segment 716 is a passive phrase and is also not within the user interface 700. Claim segment 710 and claim segment 716 also do not include a reference label because they are not allocated within the user interface 700.

Although not illustrated in FIG. 7, the claim segments (or nodes that provide visual containers for the claim segments) may include a delete icon that allows the claim segment to be unallocated from the user interface 700. In response to input to delete a claim segment, the user interface 700 would recalculate the flowchart illustrated in the user interface 700 and change the feedback provided by the corresponding claim segment in the claim panel 702.

In addition, the nodes may each contain a grouping option that allows nodes to be combined into groups or combined with a previous paragraph when the specification is drafted. In this example, a grouping option 724 for claim segment 720 and a grouping option 726 are illustrated and remaining nodes are not illustrated with this option for convenience. When the grouping options 724 and 726 are selected, the specification generation groups these claim segments and drafts the specification based on the grouping. That is, the claim segments 720 and 722 may be described in a single paragraph for simplicity.

Further, the claim segments in the user interface 700 may be configured to be excluded from the final set of claims. In an example, the reference label in the claim segment 722 may be selected to indicate that this subject matter can be excluded from the final claims. In this example, when the reference label is selected, the reference label is replaced by an option 728 that is unchecked to indicate that the claim associated with the claim segment 722 is to be omitted from the final claims. When the option 728 is further selected, the claim corresponding to the claim segment 722 would be included. The option 728 may also be used to suppress a node from being created in a corresponding a flowchart drawing (i.e., a drawing document including the flowchart).

Thus, the claim panel 702 provides a visual feedback scheme that is used in conjunction with the user interface 700 to allow the user to easily manipulate the various claim segments to visually draft the specification using a drag and drop user interface. In addition, additional user interface options are illustrated that further allow finer control of the specification and allowing the user to include content generated from the input claims while simultaneously excluding these claims from the finalized claims. As a result, the user is able to provide a detailed set of preliminary claims to effectively draft all necessary details, then selectively remove claims from the claims section in the generated patent specification.

In another example, a separate component can be provided to allow claims to be composed into different statutory classes using the claim segments and various templates. In such a component, the user would be able to select a final set of claims based on the set of preliminary claims and the composed claims. The application could manage the claim content using the user interface to ensure correct claim numbering, correct claim dependency, and so forth.

FIG. 8 illustrates an example node 800 that allow complex manipulation of claim segments to create complex descriptions in the patent specification. In particular, the node 800 can be associated with claim segment 802, which has been allocated reference label YY1 and includes a delete icon 804 and a control 806 for selecting a structure to perform the action associated with claim segment 802. Further, the node 800 can include a tab interface 810 to allow other active claim segments that further define claim segment 802. In the example illustrated in FIG. 8, claim segment 812 and claim segment 814 further define a first embodiment illustrated in the first tab 816. That is, a claim segment 812 further defines claim segment 802 by recited an action that is encompassed within claim segment 802.

Further, the first embodiment illustrated in tab 816 can include drop zone 818, drop zone 820, drop zone 822, drop zone 824, and drop zone 826 to allow other claim segments to be dropped into the first tab 816. Thus, the node 800 may contain a separate sub-flowchart interface fully embedded within a claim segment. Moreover, each segment within the node can also include a separate flowchart interface, allowing unlimited recursion of flowcharts.

The tab interface 810 can also include multiple tabs such as second tab 828 and third tab 830 in this example. To generate the first tab, the claim segment 812 is dragged and dropped into the claim segment 802 (or node 800). Similarly, to generate the second tab, another segment (not shown) is dragged into the claim segment 802 (or node 800).

The second tab 828 and third tab 830 allow different claim segments to be inserted, thereby allowing multiple embodiments that are mutually exclusive to be provided. Moreover, when generating the specification, the different embodiments illustrated in the first tab 816, second tab 828, and third tab 830 will be described separately in the patent specification, thereby allowing the system to generate a more accurate specification and require less human editing and revision.

Figure 9A:
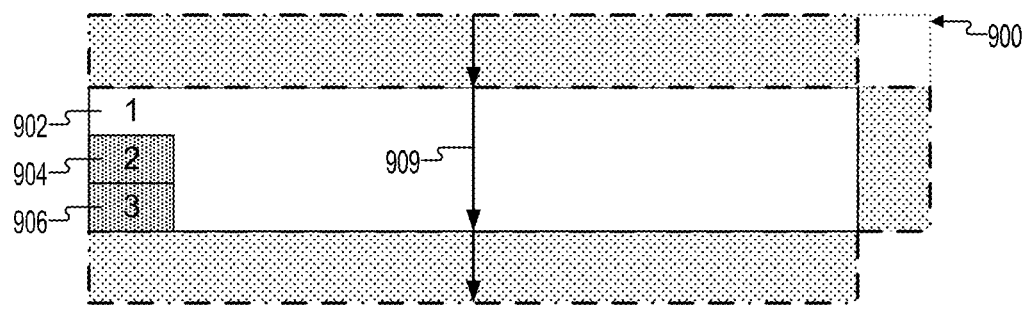
FIGS. 9A, 9B, and 9C illustrate an example node that allows complex relationships of claim segments.
Figure 9B:
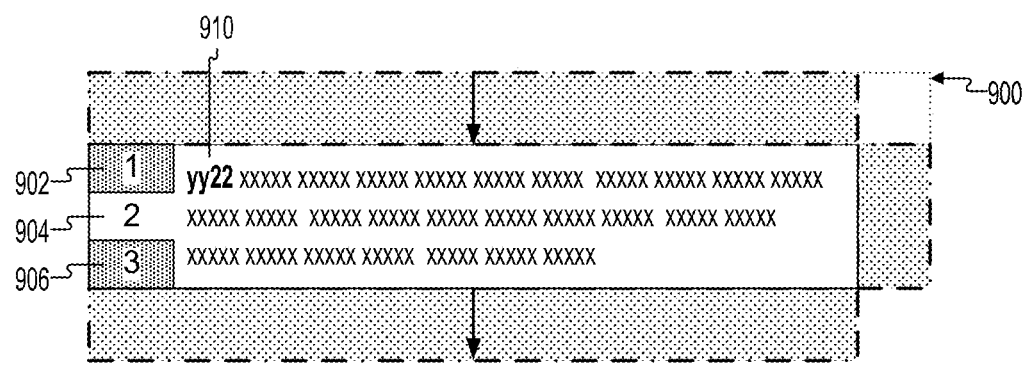
Figure 9C:
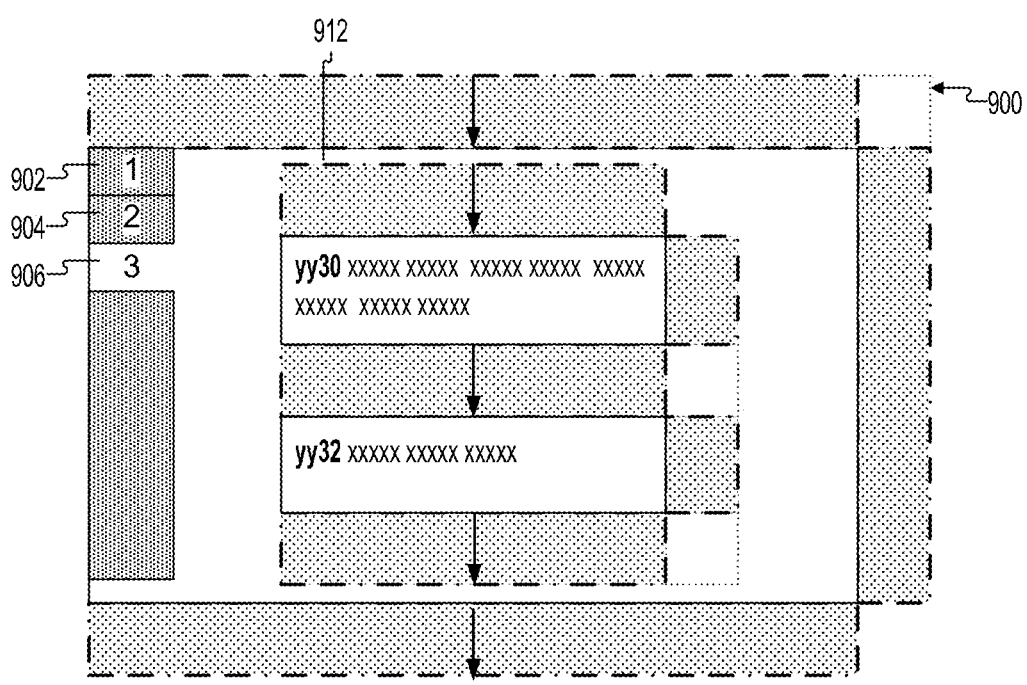

FIGS. 9A, 9B, and 9C illustrate an example node 900 that allows different alternatives. In particular, FIGS. 9A, 9B, and 9C illustrate a bypass segment that allows optional actions to be defined in the user interface.

Specifically, FIG. 9A, the node 900 includes a tab interface including a first tab 902, second tab 904, and a third tab 906 for illustration purposes. The first tab 902 comprises an arrow 908 that corresponds to an edge in graph theory and simply indicates that no further actions occur at node 900. That is, in the first tab 902, the node 900 is bypassed in the execution of the flowchart.

However, if the user selects the second tab 904, the node 900 displays the second tab 904 illustrated in FIG. 9B. In FIG. 9B, the second tab 904 is associated with a claim segment 910, and indicates an optional node that can be executed in the flowchart.

Further, if the user selects the third tab 906, the node displays the third tab 906 illustrated in FIG. 9C. The third tab comprises a flowchart user interface 912 that is embedded and allows additional claim segments to be inserted and manipulated based on dragging and dropping into the claim segments and drop zones as noted above.

That is, in the example illustrated in FIGS. 9A, 9B, and 9C, the application may be configured to generate different flowcharts using the bypass segment in node 900. The application may also be configured to generate sub-flowcharts linked to the main flowchart similar to FIG. 8.

The examples illustrated in FIGS. 8, 9A, 9B, and 9C illustrate that the nodes allow optional segments and optional sub-flowcharts to be defined to thereby allow more complex associations with the claim segments to be defined. Based on the various nodes described above, the user interface is able to represent an entire set of method claims regardless of the complexity of the method claims. However, while the various examples can be illustrated in a single dynamic user interface, generating a single drawing with all detail may not be possible. Accordingly, in some examples, the system may also generate a separate drawing for each sub-flowchart or may generate additional flowcharts illustrating all variations of the flowcharts.

Further, the above examples illustrate simple flowcharts for clarity and conciseness. However, the user interfaces illustrated above can be embedded into nodes, thereby allowing unlimited complexity if required. Further, at best one conditional branch is illustrated, but conditions can be linked (i.e., a switch operation) to allow unlimited complexity in the flowchart. For simplicity, the above user interfaces are referred to as directed acrylic graph (DAG) because the flow of the user interface does not allow a previous node to be revisited. However, the instant disclosure is not limited to DAG and can be bidirectional, allowing previous nodes to be revisited (i.e., a loop).

FIG. 10 illustrates a user interface 1000 that allows a user to provide input into the user interface 1000 to build a specification using point and click operations in conjunction with a client-specific module. In particular, the user interface 1000 illustrates a header region 1002, a template region 1004, and a specification region 1006. The header region 1002 is related to a "wizard" or "stepper" component that allows the user to select different stages to control the creation of the patent specification. As will be described below, the header region 1002 dynamically adds and removes steps based on inputs received in interfaces prior to the presentation of user interface 1000, inputs after the presentation of user interface 1000, and inputs into the user interface 1000.

In the user interface 1000, the user selects different templates that are used to generate the specification from the template region 1004. In response, the specification region 1006 generates a specification section corresponding to a template selected in the template region 1004 and provides some detail, such as the illustrated figure number (e.g., Figure A). Although the specification sections illustrated in the specification region 1006 generally are associated with illustrations, the specification sections can also include text-only regions such as a boilerplate related to a legal interpretation of a term. As an example, the text-only region can include text that is devised based on the administrative agency's guidance with respect to a particular legal issue (e.g., subject matter eligibility) or administrative issue that comports with the agency's guidance.

Further, the different specification sections can easily be rearranged in the specification region 1006 to allow the user to essentially point and click to create a specification.

In FIG. 10, the example user interface includes a specification template 1008 related to a first method claim (claim A) and a specification template 1010 related to a second claim (claim C). The user is able to select either specification template 1008 and/or specification template 1010, which then allows the user interface 1000 to add a module 1012 corresponding to that claim. As illustrated in FIG. 10, the user selects the specification template 1008, which causes the header region 1002 to dynamically insert a module 1012 for generating content associated with that claim. As noted above, the module may be a flowchart user interface. Further, as illustrated in FIG. 10, claim B is not detected as a method claim and, therefore, the template region 1004 excludes any potential drawing related to a flowchart for claim B. However, in some examples, the system may generate a flowchart based on a device or system claim using NLP.

FIG. 10 also illustrates a client-specific module 1014, which was added based on an identification of the client. In this example, the client is a legal entity (e.g., a corporation) or a person that would benefit from the operation of a module 1014 that is specific to their needs. That is, the application determines whether the patent specification to be generated corresponds to a specific client that has a client module for generating specification data. If the patent specification corresponds to the specific client, the client-specific module 1014 is inserted into the component for execution before or after the user interface 1000.

The client-specific module 1014 provides a user interface to creating specification data that is specific to that client. A client may have specific content that needs to be recreated and the client-specific module 1014 provides a user interface for generating the same. For example, a first client may require multiple timing diagrams, a second client may require a circuit diagram having a similar layout, and a third client may require an engine illustration that requires different labels. Using the NLP tokens, claim segments, inputs described above, and other inputs unique to the client-specific module 1014, the client-specific module 1014 may generate specification data for creating a drawing and specification content. Thus, the client-specific module 1014 is tuned specifically for each client to provide better and more accurate specifications.

Figure 11:
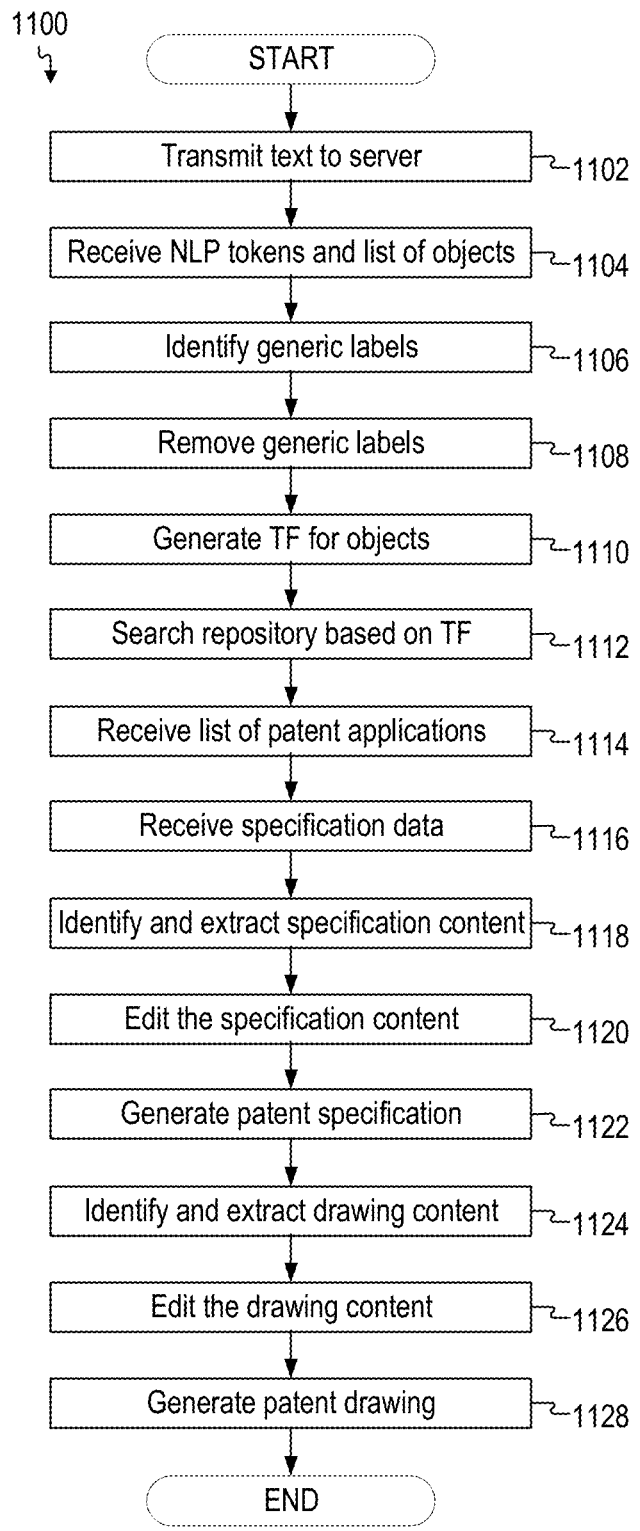
FIG. 11 is a flowchart of a method for generating a patent specification based on a related application that is identified using NLP.

FIG. 11 illustrates a flowchart of a method 1100 for generating a specification based on related application that is identified using NLP. Although the example method 1100 depicts a particular sequence of operations, the sequence may be altered without departing from the scope of the present disclosure. For example, some of the operations depicted may be performed in parallel or in a different sequence that does not materially affect the function of the method 1100. In other examples, different components of an example device or system that implements the method 1100 may perform functions at substantially the same time or in a specific sequence.

According to some examples, the method 1100 includes transmitting text associated with patent claims to a server for NLP analysis, the patent claims comprising an independent claim and at least one dependent claim that form a set of claims at step 1102. For example, the processor 1305 illustrated in FIG. 13 may transmit text associated with patent claims to a server for NLP analysis, the patent claims comprising an independent claim and at least one dependent claim that form a set of claims.

According to some examples, the method 1100 includes receiving NLP tokens from the server based on the NLP analysis and a list of objects that are identified in the text based on the NLP analysis at step 1104. For example, the processor 1305 illustrated in FIG. 13 may receive NLP tokens from the server based on the NLP analysis and a list of objects that are identified in the text based on the NLP analysis. In this case, the list of objects are n-grams (i.e., compound words) that are extracted from the claims.

According to some examples, the method 1100 includes identifying generic labels in the list of objects that distinguish similar objects from each other at step 1106. For example, the processor 1305 illustrated in FIG. 13 may identify generic labels in the list of objects that distinguish similar objects from each other. For example, the generic label may be an ordinal number (first, second, etc.), a past tense adjectival modifier (e.g., selected, displayed, etc.), and so forth.

According to some examples, the method 1100 includes, for each similar object, removing the generic labels to create a single object corresponding to each similar object at step 1108. For example, the processor 1305 illustrated in FIG. 13 may, for each similar object, remove the generic labels to create a single object corresponding to each similar object.

According to some examples, the method 1100 includes generating a term frequency (TF) for a set of first objects based on the list of objects at step 1110. For example, the processor 1305 illustrated in FIG. 13 may generate a term frequency (TF) for a set of first objects based on the list of objects. That is, the generic label is stripped from the n-gram to distill the n-grams to their most basic form and count the most frequent n-grams.

According to some examples, the method 1100 includes searching a patent application repository based on the TF of the set of first objects at step 1112. For example, the processor 1305 illustrated in FIG. 13 may search a patent application repository based on the TF of the set of first objects. In an example, the searching of the patent application repository is based on a comparison of claims.

In an example of the searching at step 1112, the method 1100 comprises comparing the TF of the set of first objects with a second list of objects, the second list of objects being associated with a second patent application in the patent application repository and being generated based on a TF of objects identified by claims in the second patent application. For example, the processor 1305 illustrated in FIG. 13 may compare the TF of the set of first objects with a second list of objects, the second list of objects be associated with a second patent application in the patent application repository and be generated based on a TF of objects identified by claims in the second patent application.

Further, searching at step 1112 may comprise determining whether to include the second patent application in the list of patent applications based on the comparison of the TF of the set of first objects and the second list of objects. For example, the processor 1305 illustrated in FIG. 13 may determine whether to include the second patent application in the list of patent applications based on the comparison of the TF of the set of first objects and the second list of objects.

In another example, the searching at step 1112 may comprise receiving at least one additional search parameter that is input by a user. For example, the processor 1305 illustrated in FIG. 13 may receive at least one additional search parameter that is input by a user. In an example, the searching of the patent application repository is further based on the at least one additional search parameter.

In the second example, the searching at step 1112 may further comprise comparing the TF of the set of first objects with a third list of objects, associated with a second patent application, the third list of objects being generated based on an term frequency-inverse document frequency (TF-IDF). For example, the processor 1305 illustrated in FIG. 13 may compare the TF of the set of first objects with a third list of objects, associated with a second patent application, the third list of objects be generated based on an TF-IDF. In an example, the determining of whether to include the second patent application in the list of patent applications is further based on the comparison of the TF of the set of first objects and the TF-IDF. Because the specification may have a high frequency of common generic structures, it may be preferable to generate the TF-IDF for the second patent application, thereby allowing a better comparison of claims to the specification.

According to some examples, the method 1100 includes receiving a list of patent applications corresponding to the TF based on the search of the patent application repository at step 1114. For example, the processor 1305 illustrated in FIG. 13 may receive a list of patent applications corresponding to the TF based on the search of the patent application repository.

According to some examples, the method 1100 includes receiving specification data generated based on user manipulation of a plurality of claim segments associated with the NLP tokens, the specification data including selection data related to a first patent application, at step 1116. For example, the processor 1305 illustrated in FIG. 13 may receive specification data generated based on user manipulation of claim segments as described above with reference to FIG. 5. However, in this example, the specification data also may include selection data related to another patent application, which is selectively incorporated based on user input.

According to some examples, the method 1100 includes identifying a document associated with the first patent application and extracting specification content from the document based on the selection data at step 1118. For example, the processor 1305 illustrated in FIG. 13 may identify a document associated with the first patent application and extract specification content from the document based on the selection data.

In another example, the identifying at step 1118 comprises identifying a start of first content related to a figure number identified by the selection data. For example, the processor 1305 illustrated in FIG. 13 may identify a start of first content related to a figure number identified by the selection data.

Further, the identifying at step 1118 further comprises identifying a start of second content related to a second figure number that follows the figure number identified by the selection data. For example, the processor 1305 illustrated in FIG. 13 may identify a start of second content related to a second figure number that follows the figure number identified by the selection data.

Further, the identifying at step 1118 comprises extracting the specification content that is located between the first content and the second content. For example, the processor 1305 illustrated in FIG. 13 may extract the specification content that is located between the first content and the second content.

Further, the identifying at step 1118 comprises searching reference numerals in the specification content based on an original figure number assigned to drawing content in the first patent application. For example, the processor 1305 illustrated in FIG. 13 may search reference numerals in the specification content based on an original figure number assigned to draw content in the first patent application.

Further, the identifying at step 1118 comprises replacing the reference numerals based on the figure number assigned to the specification content. For example, the processor 1305 illustrated in FIG. 13 may replace the reference numerals based on the figure number assigned to the specification content.

Further, the identifying at step 1118 comprises identifying a summary description corresponding to the figure number in a section of the first patent application related to drawing descriptions. For example, the processor 1305 illustrated in FIG. 13 may identify a summary description corresponding to the figure number in a section of the first patent application related to drawing descriptions.

Further, the identifying at step 1118 comprises extracting the summary description. For example, the processor 1305 illustrated in FIG. 13 may extract the summary description.

According to some examples, the method 1100 includes editing the specification content based on a figure number assigned to the specification content at step 1120. For example, the processor 1305 illustrated in FIG. 13 may edit the specification content based on a figure number assigned to the specification content.

According to some examples, the method 1100 includes generating a patent specification based on the specification data and including the specification content, the patent specification comporting with a plurality of procedural requirements, at step 1122. For example, the processor 1305 illustrated in FIG. 13 may generate a patent specification based on the specification data and include the specification content, the patent specification comport with a plurality of procedural requirements.

According to some examples, the method 1100 includes identifying a drawing associated with the first patent application and extracting drawing content from the drawing based on the selection data at step 1124. For example, the processor 1305 illustrated in FIG. 13 may identify a drawing associated with the first patent application and extract drawing content from the drawing based on the selection data. However, the disclosure can also be applicable to content that relates to content reuse through searching using different techniques. For instance, the disclosure can be applied to a legal document (e.g., a contract, an agreement, etc.) and/or a formal document (e.g., a petition, a plan, a proposal, a request for proposal (RFP), change request, invoice, etc.) comporting with at least one procedure, statute, or requirement.

According to some examples, the method 1100 includes editing the drawing content based on the figure number at step 1126. For example, the processor 1305 illustrated in FIG. 13 may edit the drawing content based on the figure number.

In another example, the editing of the drawing content at step 1126 comprises searching text labels based on an original figure number assigned to the drawing content in the first patent application. For example, the processor 1305 illustrated in FIG. 13 may search text labels based on an original figure number assigned to the drawing content in the first patent application.

Further, the method 1100 comprises replacing a portion of the text labels based on the figure number assigned to the specification content. For example, the processor 1305 illustrated in FIG. 13 may replace a portion of the text labels based on the figure number assigned to the specification content.

According to some examples, the editing of the drawing content at step 1126 comprises generating patent drawings based on the specification data and including the drawing content at step 1128. For example, the processor 1305 illustrated in FIG. 13 may generate patent drawings based on the specification data and include the drawing content.

FIG. 12 illustrates an example user interface 1200 that may implement a portion of the features described in FIG. 11. FIG. 12 illustrates a "wizard" or "stepper" component similar to FIG. 10 including a header 1202 and a specification region 1206. The user interface 1200 further includes a search results panel 1208 that illustrates a first application 1210, a second application 1212, and a third application 1214, which are identified based on a result of the TF search described above.

Each application displayed in the search results panel 1208 includes various static information such as serial number, docket number, a summary, and a description. The description may be scrollable or may allow the user to selectively display a portion of the description. Using the user interface for each application, the user is able to quickly review each drawing and may identify related content that is similar to the current application that is being drafted.

Similar to FIG. 10, the user interface 1200 allows the user to select a drawing and selectively incorporate the same into the specification region 1206. As illustrated in FIG. 12, Figure C of Docket No. XXXXX is selected to be Figure E of the current application and Figure A of Docket No. YYYYY is selected to be Figure F of the current application. As noted above with respect to FIG. 11, the system generates specification data identifying the subject matter from the first application 1210 and second application 1212 to incorporate in the current application. Because current documents and drawings are stored in an XML format, the system is able to extract the selected content from the original source, modify the selected content based on the user input, and insert the modified content. However, in some examples, the drawing may not be stored in an XML format. In that case, the system may convert the drawing into a bitmap and then insert the bitmap drawing into the new drawing.

The examples disclosed above allow more accurate and more complete patent specifications to be generated using a dynamic and intuitive user interface. Further, the examples disclosed above allow better tokenization of the claims. Further, unlike existing system, because the disclosed user interface can represent all method claims and variations of the method claims, complex specifications and more complex drawings can be created, which minimizes revision of the generated patent specification. In addition, prior systems have only contemplated generating a single flowchart for each set of method claims. However, the examples described above disclose that a set of method claims can be converted into multiple flowcharts and multiple descriptions. The patent specifications generated by the instant disclosure therefore are more complete, more accurate, and require minimal revision, thereby providing a benefit over existing systems. Finally, a search system is disclosed that searches for related applications using NLP analysis of the claims and NLP analysis of the previously filed patent application. Using the disclosed search system, the user is able to selectively incorporate content from related applications and the search system updates the selected content to facilitate editing and incorporating additional or different subject matter.

Figure 13:
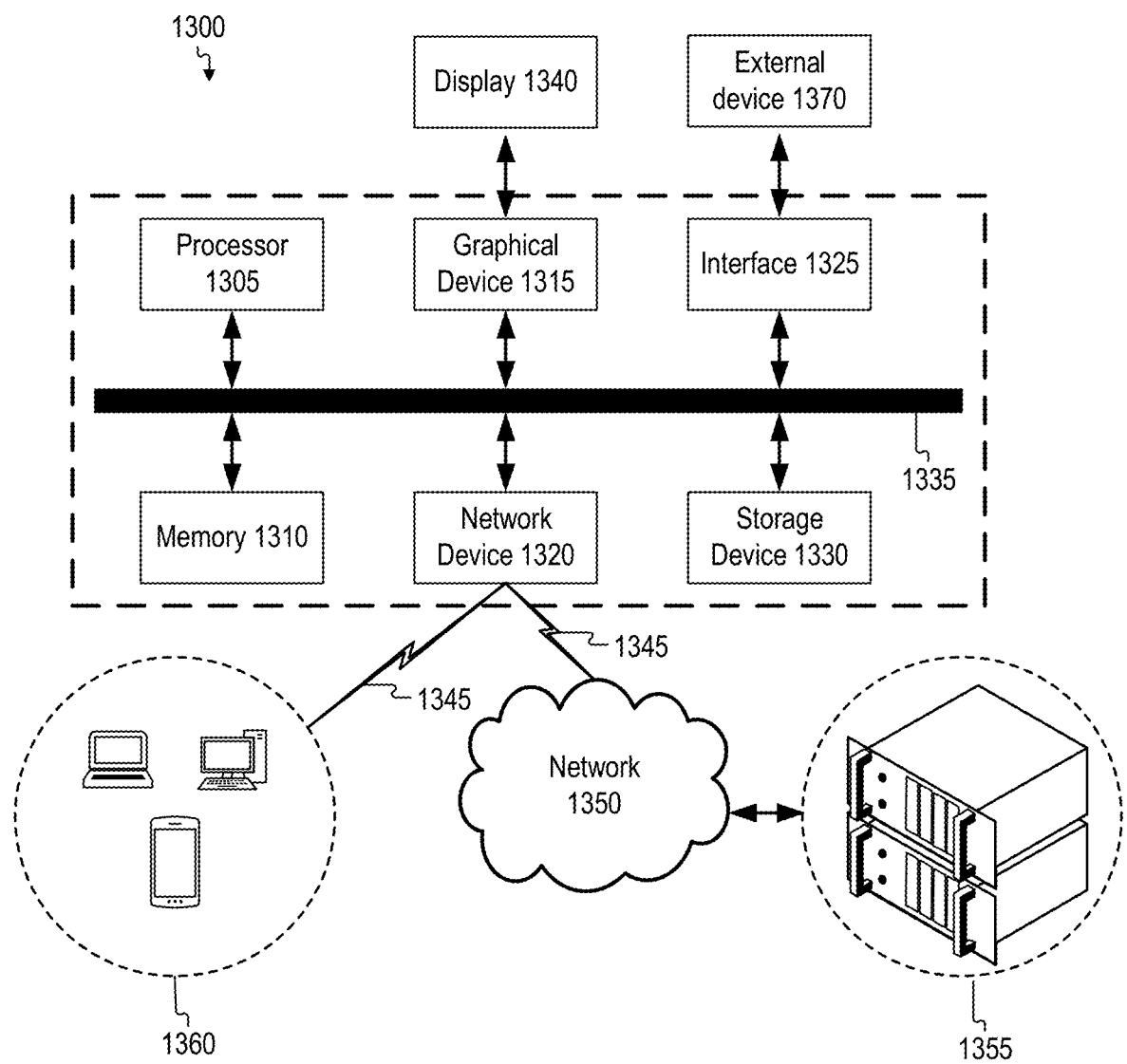
FIG. 13 illustrates an example computer system for executing client or server operation.

FIG. 13 illustrates an example computer system 1300 for executing client or server operations. For example, the example computer system 1300 may execute a client application, a server side application for performing the instant disclosure, or an NLP engine.

The example computer system 1300 includes a processor 1305, a memory 1310, a graphical device 1315, a network device 1320, interface 1325, and a storage device 1330 that communicate and operate via a connection 1335. The connection 1335 can be a physical connection via a bus, or a direct connection into processor 1305, such as in a chipset architecture. The connection 1335 can also be a virtual connection, networked connection, or logical connection.

The processor 1305 reads machine instructions (e.g., reduced instruction set (RISC), complex instruction set (CISC), etc.) that are loaded into the memory 1310 via a bootstrapping process and executes an operating system for executing applications within frameworks provided by the operating system. That is, the processor 1305 can include any general-purpose processor and a hardware service or software service, which are stored in memory 1310, and configured to control processor 1305 as well as a special-purpose processor where software instructions are incorporated into the actual processor design. The processor 1305 may essentially be a completely self-contained computing system, containing multiple cores or processors, a bus, memory controller, cache, etc. A multi-core processor may be symmetric or asymmetric.

For example, the processor 1305 may execute an application that executes an application provided by a graphical framework such as Winform, WPF, Windows User Interface (WinUI), or a cross platform user interface such as Xamarin or QT. In other examples, the processor 1305 may execute an application that is written for a sandbox environment such as a web browser.

The processor 1305 controls the memory 1310 to store instructions, user data, operating system content, and other content that cannot be stored within the processor 1305 internally (e.g., within the various caches). The processor 1305 may also control a graphical device 1315 (e.g., a graphical processor) that outputs graphical content to a display 1340. In some example, the graphical device 1315 may be integral within the processor 1305. In yet another example, the display 1340 may be integral with the computer system 1300 (e.g., a laptop, a tablet, a phone, etc.). In some example, the graphical device 1315 may be integral with the processor 1305 and form an accelerated processing unit (APU).

The graphical device 1315 may be optimized to perform floating point operations such as graphical computations, and may be configured to execute other operations in place of the processor 1305. For example, controlled by instructions to perform mathematical operations optimized for floating point math. For example, the processor 1305 may allocate instructions to the graphical device 1315 for operations that are optimized for the graphical device 1315. For instance, the graphical device 1315 may execute operations related to artificial intelligence (AI), natural language processing (NLP), and vector math. The results may be returned to the processor 1305. In another example, the application executing in the processor 1305 may provide instructions to cause the processor 1305 to request the graphical device 1315 to perform the operations. In other examples, the graphical device 1315 may return the processing results to another computer system (i.e., distributed computing).

The processor 1305 may also control a network device 1320 for transmits and receives data using a plurality of wireless channels 1345 and at least one communication standard (e.g., Wi-Fi (i.e., 802.11ax, 802.11e, etc.), Bluetooth®, various standards provided by the 3rd Generation Partnership Project (e.g., 3G, 4G, 5G), or a satellite communication network (e.g., Starlink®). The network device 1320 may wirelessly connect to a network 1350 to connect to servers 1355 or other service providers. The network device 1320 may also be connected to the network 1350 via a physical (i.e., circuit) connection. The network device 1320 may also directly connect to local electronic device 1360 using a point-to-point (P2P) or a short range radio connection.

The processor 1305 may also control an interface 1325 that connects with an external device 1370 for bidirectional or unidirectional communication. The interface 1325 is any suitable interface that forms a circuit connection and can be implemented by any suitable interface (e.g., universal serial bus (USB), Thunderbolt, and so forth). The external device 1365 is able to receive data from the interface 1325 to process the data or perform functions for different applications executing in the processor 1305. For example, the external device 1365 may be another display device, a musical instrument, a computer interface device (e.g., a keyboard, a mouse, etc.), an audio device (e.g., an analog-to-digital converter (ADC), a digital-to-analog converter (DAC)), a storage device for storing content, an authentication device, an external network interface (e.g., a 5G hotspot), a printer, and so forth.

The storage device 1330 can be a non-volatile memory device and can be a hard disk or other types of computer readable media which can store data that are accessible by a computer, such as flash memory, solid state memory devices, an electro-mechanical data storage such as a hard disk drive (HDD), optical storage medium such as digital versatile disks, cartridges, random access memories (RAMs), read only memory (ROM), and/or some combination of these devices. In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

The storage device 1330 can include software services, servers, services, etc., that when the code that defines such software is executed by the processor 1305, it causes the system to perform a function. In some embodiments, a hardware service that performs a particular function can include the software component stored in a computer-readable medium in connection with the necessary hardware components, such as processor 1305, connection 1335, external device 1370, etc., to carry out the function.

While much of the above description is focused on receiving claim segments as an input into the natural language processing engine, other inputs are possible. For example, in some embodiments, an initial input could be a figure having labels. In such an embodiment, the drafting system would identify each label and query an author for a description of the labeled portion and its interaction or relationship with another labeled portion. These descriptions of the labeled portions and their interactions or relationships with other labeled portions can be fed into the natural language processing server. Thereafter the natural language processing server can output structured statements in an initial sequence for additional refinement and rearranging by the user as described above.

While much of the above description referred to the presentation of claim segments in the form of a flowchart other mechanisms for the presentation of the claim segments (structured statements) are contemplated. For example a flowchart can be viewed as a stand-in for an outline. A flowchart as discussed above as an example embodiment mainly because it is also a required feature of a software patent application, but an outline format would be just as effective. And in outline format would be more intuitive for other types of documents. In an outline format individual statements can be levels of an outline, and just as described above the various levels of outline can be rearranged into independent concepts and nested concepts just as described above.

As described above the present technology can receive any collection of statements having a basic relationship between the statements and can extract parts of speech from these statements and provide an initial organization for the statements. Thereafter the present technology can receive further inputs to rearrange and modify and add to the statements and ultimately provide an initial draft of a document. In this way the present technology provides advantages over existing technologies through improvements in the machine-user interface improvements and inputs to natural language processing server improvements income terms of complexity of initial inputs and subsequent inputs which all can result in a better initial draft provided by the national language processing server and available from existing technologies.

The disclosed system can be applied to any type of standardized document that has a structure that may benefit from visually organizing concepts to form complex relationships from input text. In some examples, the disclosed system can be used to arrange a contract or an agreement based on text input. In other examples, the disclosed system can be used a new drug application at the FDA, a change request for a manufacturing process, a non-disclosure agreement, a technical paper that presents a flowchart or sequence diagram.

The disclosed system can be used to arrange a contract or another type agreement based on text input (e.g., a non-disclosure agreement, an employment agreement, a contract, etc.). An agreement related to a contract may need to specify obligations and consequences of achieving of failing to achieve those obligations. The instant disclosure could receive a text-based input and generate a flowchart, which would then be converted into legal text based on various templates.

In other examples, the disclosed system can be used a new drug application at the U.S. Food & Drug Administration (FDA), a change request for a manufacturing process, or a proposal. As an example, the disclosed system may implement a named entity recognition (NER) module to identify chemical compounds and use the identified chemical compounds to create a user interface that would allow the user to control components to create description for the new drug application.

Additional concepts can be incorporated to further benefit the disclosed system. For instance, an NER module can be trained based on patent claims to identify common words and identify points to segment claims and identify logical breaks in claims. An NER module may also be used to analyze language and generate a sequence diagram illustrating communication between different devices such as FIG. 3 of the instant disclosure. The user would be provided an interface similar to the disclosure above to allow correction of the communication sequence and then further create a description of the communication sequence.

However, the disclosure can also be applicable to content that relates to content reuse through searching using different techniques. For instance, the disclosure can be applied to a legal document (e.g., a contract, an agreement, etc.) and/or a formal document (e.g., a petition, a plan, a proposal, a request for proposal (RFP), change request, invoice, etc.) comporting with at least one procedure, statute, or requirement.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although the example method illustrated herein depict a particular sequence of operations, the sequence may be altered without departing from the scope of the present disclosure. For example, some of the operations depicted may be performed in parallel or in a different. In other examples, different components of an example device or system that implements the methods illustrated herein may perform functions at substantially the same time or in a specific sequence.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A method for generating a document, comprising:
receiving natural language processing (NLP) tokens from an NLP analysis of patent claims, the patent claims comprising an independent claim and at least one dependent claim that depends from the independent claim and form a set of claims;
generating claim segments for the set of claims from the NLP tokens based on an analysis of the NLP tokens;
selecting a portion of claim segments to display;
displaying a flowchart including the portion of the claim segments in a first order;
receiving an input to change the first order of the claim segments into a second order of the claim segments that is different from the first order, wherein the second order of the claim segments includes a dependent claim segment of the at least one dependent claim that occurs in the flowchart before a different claim segment of the independent claim;
displaying the claim segments in the flowchart in the second order of the claim segments; and
generating specification data used to create a patent specification, the patent specification including a description of the flowchart based on the second order of the claim segments.

2. The method of claim 1, wherein the displaying of the claim segments comprises:
displaying a claim area, the claim area illustrating the set of claims and claim segments corresponding to the set of claims, wherein a portion of the claim segments include graphical demarcations to provide visual information regarding a state of the claim segment.

3. The method of claim 2, wherein a first graphical demarcation applied to a first claim segment in the claim area indicates that the first claim segment is displayed in the flowchart.

4. The method of claim 3, wherein a second graphical demarcations applied to a second claim segment in the claim area indicates that the second claim segment comprises active language and the second claim segment is not displayed in the flowchart.

5. The method of claim 4, wherein the input comprises dragging the second claim segment into the flowchart, and, after the second claim segment is dragged into the flowchart, the first graphical demarcation is applied to the second claim segment in the claim area.

6. The method of claim 3, wherein a third graphical demarcations applied to a third claim segment in the claim area indicated that the third claim segment comprises passive language and is not displayed in the flowchart.

7. The method of claim 6, wherein the input comprises dragging the third claim segment into the flowchart, and, after the third claim segment is dragged into the flowchart, the first graphical demarcation is applied to the third claim segment in the claim area.

8. The method of claim 1, further comprising:
receiving a second input to indicate that language of a second claim segment partially defines a first claim segment that is displayed within the flowchart; and
displaying a first sub-flowchart within the first claim segment in the flowchart.

9. The method of claim 8, wherein a first drawing is generated from the specification data that corresponds to the flowchart and a second drawing is generated from the specification data that corresponds to the first sub-flowchart.

10. The method of claim 8, further comprising:
receiving a third input to indicate that language of a third claim segment partially defines the first claim segment displayed within the flowchart; and
displaying a second sub-flowchart within the first claim segment in the flowchart.

11. The method of claim 10, wherein a first drawing is generated from the specification data that corresponds to the flowchart, a second drawing is generated from the specification data that corresponds to the first sub-flowchart, and a third drawing is generated from the specification data that corresponds to the second sub-flowchart.

12. The method of claim 11, further comprising:
receiving a second input on a first input control on a first claim segment for identifying a structure that performs an action corresponding to the first claim segment,
wherein the patent specification includes text that expresses that the structure performs the action corresponding to the first claim segment.

13. The method of claim 12, further comprising:
receiving a third input on a second input control for selecting a drawing associated with the patent specification;
identifying a plurality of structures included in the drawing, the plurality of structures including the structure that performs the action corresponding to the first claim segment; and
updating the first input control to allow selection of each of the plurality of structures.

14. The method of claim 12, wherein the generating of the patent specification comprises composing a device claim based on the independent claim, wherein the device claim includes the text indicating that the structure performs the action corresponding to the first claim segment.

15. The method of claim 11,
wherein each claim segment corresponds to an active phrase or a passive phrase,
wherein the active phrase comprises a gerund verb that corresponds to a root word of the claim segment based on the NLP analysis, and
wherein the passive phrase further defines a gerund verb or an object in another claim segment.

16. A method comprising:
displaying claim segments that are arranged in a first order in a list of claim segments in a flow region, wherein each claim segment is linked to at least one other segment via an edge member to illustrate a flowchart, and wherein each claim segment comprises a list of natural language processing (NLP) tokens to form a phrase having a verb and an object of the verb;
displaying a set of claims in a claim region illustrating claim segments identified from the set of claims based on the first order, the set of claims comprising demarcations to indicate whether a claim segment in set of claims is contained within the list of segments;
in response to an input to edit content in the list of claim segments, determining a type of the input to edit the list of claim segments;
recalculating an order of claim segments in the list based on the type of input to generate a second order;
displaying claim segments that are arranged in a second order in the flow region;
displaying the set of claims in the claim region based on the second order; and
generating specification data used to create a patent specification, wherein the patent specification includes a description of a flowchart based on the second order.

17. A system comprising:
a storage configured to store instructions;
a processor configured to execute the instructions and cause the processor to:
receive natural language processing (NLP) tokens from an NLP analysis of patent claims, the patent claims comprising an independent claim and at least one dependent claim that depends from the independent claim and form a set of claims;
generate claim segments for the set of claims from the NLP tokens based on an analysis of the NLP tokens;
select a portion of claim segments to display;
display a flowchart including the portion of the claim segments in a first order;
receive an input to change the first order of the claim segments into a second order of the claim segments that is different from the first order, wherein the second order of the claim segments includes a dependent claim segment of the at least one dependent claim that occurs in the flowchart before a different claim segment of the independent claim;
display the claim segments in the flowchart in the second order of the claim segments; and
generate specification data used to create a patent specification, the patent specification including a description of the flowchart based on the second order of the claim segments.

18. The system of claim 17, wherein the processor is configured to execute the instructions and cause the processor to:
display a claim area, the claim area illustrating the set of claims and claim segments corresponding to the set of claims, wherein a portion of the claim segments include graphical demarcations to provide visual information regarding a state of the claim segment.

19. The system of claim 18, wherein a first graphical demarcation applied to a first claim segment in the claim area indicates that the first claim segment is displayed in the flowchart.

20. The system of claim 19, wherein a second graphical demarcations applied to a second claim segment in the claim area indicates that the second claim segment comprises active language and the second claim segment is not displayed in the flowchart.

21. The system of claim 20, wherein the input comprises dragging the second claim segment into the flowchart, and, after the second claim segment is dragged into the flowchart, the first graphical demarcation is applied to the second claim segment in the claim area.

22. The system of claim 19, wherein a third graphical demarcations applied to a third claim segment in the claim area indicated that the third claim segment comprises passive language and is not displayed in the flowchart.

23. The system of claim 22, wherein the input comprises dragging the third claim segment into the flowchart, and, after the third claim segment is dragged into the flowchart, the first graphical demarcation is applied to the third claim segment in the claim area.

24. The system of claim 17, wherein the processor is configured to execute the instructions and cause the processor to:
receive a second input to indicate that language of a second claim segment partially defines a first claim segment that is displayed within the flowchart; and
display a first sub-flowchart within the first claim segment in the flowchart.

25. The system of claim 24, wherein a first drawing is generated from the specification data that corresponds to the flowchart and a second drawing is generated from the specification data that corresponds to the first sub-flowchart.

26. The system of claim 24, wherein the processor is configured to execute the instructions and cause the processor to:
receive a third input to indicate that language of a third claim segment partially defines the first claim segment displayed within the flowchart; and
display a second sub-flowchart within the first claim segment in the flowchart.

27. The system of claim 26, wherein a first drawing is generated from the specification data that corresponds to the flowchart, a second drawing is generated from the specification data that corresponds to the first sub-flowchart, and a third drawing is generated from the specification data that corresponds to the second sub-flowchart.

28. The system of claim 27, wherein the processor is configured to execute the instructions and cause the processor to:
receive a second input on a first input control on a first claim segment for identifying a structure that performs an action corresponding to the first claim segment,
wherein the patent specification includes text that expresses that the structure performs the action corresponding to the first claim segment.

29. The system of claim 28, wherein the processor is configured to execute the instructions and cause the processor to:
receive a third input on a second input control for selecting a drawing associated with the patent specification;
identify a plurality of structures included in the drawing, the plurality of structures including the structure that performs the action corresponding to the first claim segment; and
update the first input control to allow selection of each of the plurality of structures.

30. The system of claim 28, wherein the generating of the patent specification comprises composing a device claim based on the independent claim, wherein the device claim includes the text indicating that the structure performs the action corresponding to the first claim segment.

31. The system of claim 27, wherein each claim segment corresponds to an active phrase or a passive phrase, wherein the active phrase comprises a gerund verb that corresponds to a root word of the claim segment based on the NLP analysis, and wherein the passive phrase further defines a gerund verb or an object in another claim segment.

\* \* \* \* \*